US012360527B2

(12) United States Patent
Takahashi et al.

(10) Patent No.: US 12,360,527 B2
(45) Date of Patent: Jul. 15, 2025

(54) FIELD REGISTRATION METHOD, FIELD REGISTRATION SYSTEM, AND FIELD REGISTRATION PROGRAM

(71) Applicant: Yanmar Holdings Co., Ltd., Osaka (JP)

(72) Inventors: Mamoru Takahashi, Osaka (JP); Yasuto Nishii, Okayama (JP); Yuji Yamaguchi, Okayama (JP); Hidetaka Suzuki, Okayama (JP); Masaaki Murayama, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 218 days.

(21) Appl. No.: 18/103,491

(22) Filed: Jan. 31, 2023

(65) Prior Publication Data
US 2023/0259129 A1    Aug. 17, 2023

(30) Foreign Application Priority Data
Feb. 15, 2022  (JP) .............................. 2022-021105

(51) Int. Cl.
*G05D 1/00*     (2024.01)
*G05D 1/224*    (2024.01)
*G05D 1/248*    (2024.01)
*G05D 105/15*   (2024.01)
*G05D 105/80*   (2024.01)

(52) U.S. Cl.
CPC ......... *G05D 1/0044* (2013.01); *G05D 1/0212* (2013.01); *G05D 1/2245* (2024.01); *G05D 1/2246* (2024.01); *G05D 1/248* (2024.01); *G05D 2105/15* (2024.01); *G05D 2105/87* (2024.01)

(58) Field of Classification Search
None
See application file for complete search history.

(56) References Cited

U.S. PATENT DOCUMENTS

| 11,076,529 | B2* | 8/2021 | Chen .................... G05D 1/028 |
| 2006/0149417 | A1 | 7/2006 | Han et al. |
| 2014/0324291 | A1 | 10/2014 | Jones et al. |
| 2019/0227561 | A1 | 7/2019 | Hiramatsu |
| 2022/0136849 | A1* | 5/2022 | Pell .................... G05D 1/2297 |
| | | | 701/410 |

FOREIGN PATENT DOCUMENTS

| EP | 3104244 A1 | 12/2016 |
| JP | 10066405 A | 3/1998 |
| JP | 2017163922 A | 9/2017 |
| JP | 2019096363 A | 6/2019 |

* cited by examiner

*Primary Examiner* — Todd Melton
(74) *Attorney, Agent, or Firm* — Chris Mizumoto

(57) ABSTRACT

An acquisition processing unit acquires position information of a work vehicle traveling in a predetermined area in response to a traveling operation by an operator. A recording processing unit records the position information, as a traveling trajectory of the work vehicle, and temporarily stops recording processing of recording the position information, in a case where the work vehicle is brought to a state in which the position information cannot be acquired during traveling. A notification processing unit notifies the operator of information indicating that the recording processing is temporarily stopped. A setting processing unit registers a field, based on the position information.

11 Claims, 15 Drawing Sheets

FIELD REGISTRATION METHOD, FIELD REGISTRATION SYSTEM, AND FIELD REGISTRATION PROGRAM

CROSS-REFERENCE

This application claims foreign priority of JP2022-021105 filed Feb. 15, 2022 and the disclosures of which are hereby incorporated by reference in their entirety.

TECHNICAL FIELD

The present invention relates to a field registration method for registering a field.

BACKGROUND ART

In recent years, progress of automation technology in agricultural machinery has led to introduction of a work vehicle that performs a work while automatically traveling in a field. In order to achieve automatic traveling of the work vehicle in a field, it is necessary to recognize and register in advance a shape of the field. Conventionally, a technique is known in which a shape of a field is recognized and registered by causing a work vehicle loaded with a positioning device that acquires position information to travel along an outer periphery of the field (see, for example, Patent Document 1).

PRIOR ART DOCUMENT

Patent Document

Patent Document 1: Japanese Unexamined Patent Application Publication No. H10-66405

SUMMARY OF INVENTION

Technical Problem

By the way, a situation may occur in which the position information cannot be acquired while a work vehicle is traveling along an outer periphery of a field. For example, in a case where communication between an operation terminal that performs processing of registering a field by acquiring the position information from a work vehicle, and the work vehicle is lost, or in a case where positioning accuracy of positioning of a work vehicle is lowered, the operation terminal cannot acquire the position information from the work vehicle. In the conventional technique, in a case where a work vehicle travels around along an outer periphery of a field, and a portion from which the position information cannot be acquired is present, the work vehicle is required to be restored to a state in which the position information can be acquired, and then travel again along the outer periphery. This deteriorates work efficiency of a registration work of registering a field.

An object of the present invention is to provide a field registration method, a field registration system, and a field registration program capable of improving work efficiency of a registration work of registering a field.

Solution to Problem

A field registration method according to the present invention includes: acquiring position information of a work vehicle traveling in a predetermined area in response to a traveling operation by a user; recording the position information, as a traveling trajectory of the work vehicle; temporarily stopping recording processing of recording the position information, in a case where the work vehicle is brought to a state in which the position information cannot be acquired during traveling; notifying the user of information indicating that the recording processing is temporarily stopped; and registering a field, based on the position information.

A field registration system according to the present invention includes an acquisition processing unit, a recording processing unit, a notification processing unit, and a registration processing unit. The acquisition processing unit acquires position information of a work vehicle traveling in a predetermined area in response to a traveling operation by a user. The recording processing unit records the position information, as a traveling trajectory of the work vehicle, and temporarily stops recording processing of recording the position information, in a case where the work vehicle is brought to a state in which the position information cannot be acquired during traveling. The notification processing unit notifies the user of information indicating that the recording processing is temporarily stopped. The registration processing unit registers a field, based on the position information.

A field registration program according to the present invention is a program causing one or more processors to execute acquiring position information of a work vehicle traveling in a predetermined area in response to a traveling operation by a user; recording the position information, as a traveling trajectory of the work vehicle; temporarily stopping recording processing of recording the position information, in a case where the work vehicle is brought to a state in which the position information cannot be acquired during traveling; notifying the user of information indicating that the recording processing is temporarily stopped; and registering a field, based on the position information.

Advantageous Effects of Invention

According to the present invention, it is possible to provide a field registration method, a field registration system, and a field registration program capable of improving work efficiency of a registration work of registering a field.

DESCRIPTION OF EMBODIMENTS

The following embodiments are an example embodying the present invention, and are not intended to limit the technical scope of the present invention.

Figure 1:
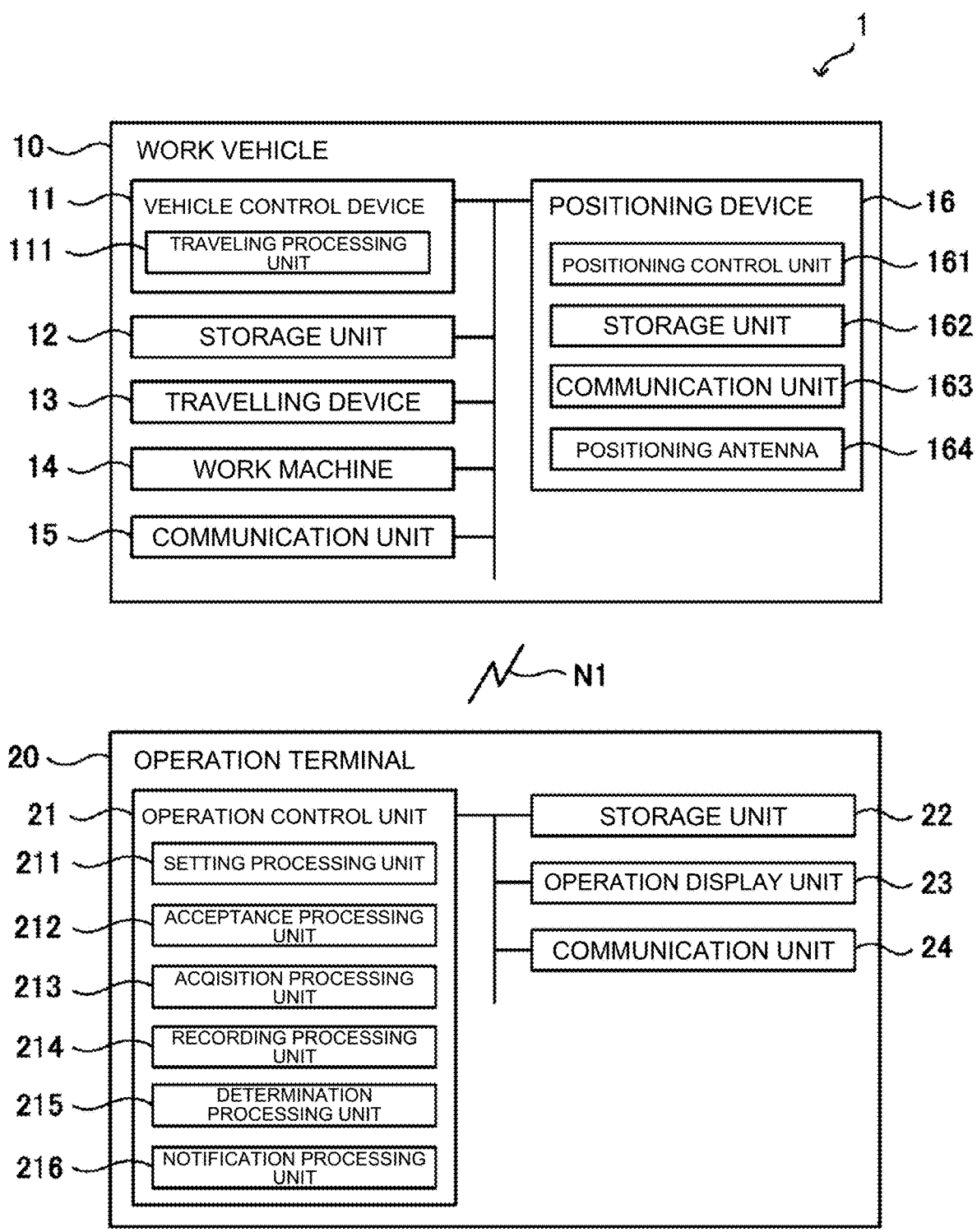
FIG. 1 is a block diagram illustrating a configuration of an automatic traveling system according to an embodiment of the present invention.

As illustrated in FIG. 1, an automatic traveling system 1 according to an embodiment of the present invention includes a work vehicle 10 and an operation terminal 20. The work vehicle 10 and the operation terminal 20 can communicate with each other via a communication network N1. For example, the work vehicle 10 and the operation terminal 20 can communicate with each other via a mobile phone network, a packet network, or a wireless LAN.

In the present embodiment, a case is described as an example, in which the work vehicle 10 is a tractor. Note that, as another embodiment, the work vehicle 10 may be a rice transplanter, a combine harvester, a construction machine, a snowplow, or the like. The work vehicle 10 is a so-called robot tractor provided with a configuration capable of automatically traveling (autonomously traveling) in a field registered in advance. For example, an operator registers a target field, and sets a target route along which the work vehicle 10 is caused to automatically travel in the field. The work vehicle 10 automatically travels along a target route that is set in advance in a field, based on position information on a current position of the work vehicle 10 to be computed by a positioning device 16. The work vehicle 10 can also perform a predetermined work while automatically traveling in the field.

Figure 3:
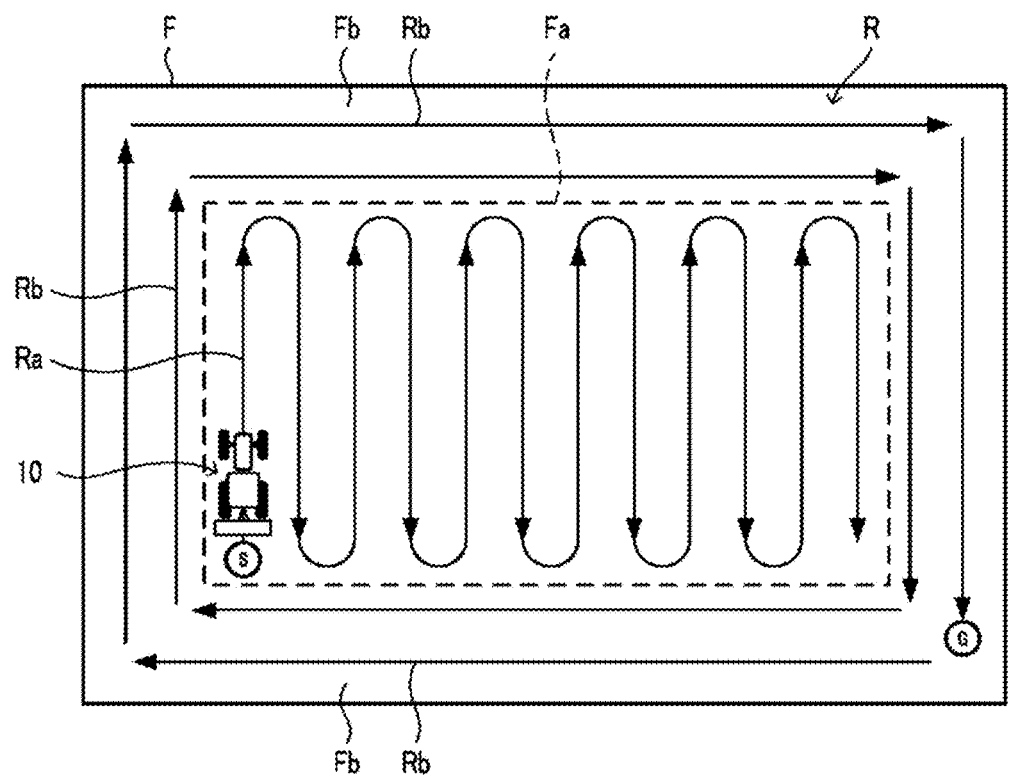
FIG. 3 is a diagram illustrating an example of a field and a target route according to the embodiment of the present invention.

For example, in a field F illustrated in FIG. 3, the work vehicle 10 performs a predetermined work while traveling back and forth in parallel along an inner work route Ra from a work start position S in an inner area Fa, and performs a predetermined work while traveling around in a spiral manner along a headland work route Rb toward a work finish position G in a headland area Fb. A target route R is not limited to the route illustrated in FIG. 3, but can be set as appropriate according to a content of a work. In FIG. 3, the work vehicle 10 initially travels in the inner area Fa, and thereafter, travels in the headland area Fb. However, the traveling order of the work vehicle 10 is not limited to this. For example, the work vehicle 10 may first travel in the headland area Fb, and thereafter, travel in the inner area Fa.

In order to achieve automatic traveling of the work vehicle 10 in the field F as described above, it is necessary to recognize and register in advance a shape of the field F. For example, an operator boards the work vehicle 10, and drives in such a way as to travel around along an outer periphery of an area to be registered, and the operation terminal 20 acquires position information during traveling from the work vehicle 10, recognizes a position and a shape of the area, based on the position information, and registers the area, as the field F.

Herein, in registration processing of the field F, a situation may occur in which the position information cannot be acquired while the work vehicle 10 is traveling along the outer periphery of the field F. For example, when communication between the operation terminal 20 and the work vehicle 10 is lost, or positioning accuracy of positioning of the work vehicle 10 is lowered, the operation terminal 20 cannot acquire the position information from the work vehicle 10. In the conventional technique, in a case where the work vehicle 10 travels around the outer periphery of the field F, and a portion from which the position information cannot be acquired is present, the work vehicle 10 is required to be restored to a state in which the position information can be acquired, and then travel again along the outer periphery. This deteriorates work efficiency of a registration work of registering the field F. In contrast, as described below, the automatic traveling system 1 according to the present embodiment can improve work efficiency of a registration work of registering the field F.

[Work Vehicle 10]

Figure 2:
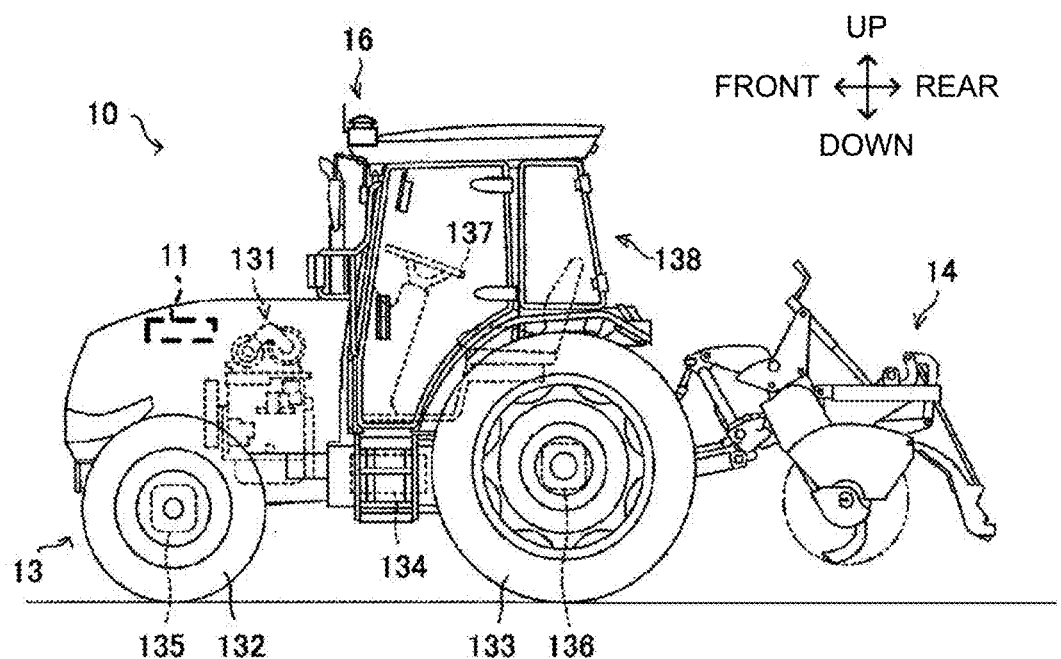
FIG. 2 is an external view illustrating an example of a work vehicle according to the embodiment of the present invention.

As illustrated in FIGS. 1 and 2, the work vehicle 10 includes a vehicle control device 11, a storage unit 12, a traveling device 13, a work machine 14, a communication unit 15, a positioning device 16, and the like. The vehicle control device 11 is electrically connected to the storage unit 12, the traveling device 13, the work machine 14, the positioning device 16, and the like. Note that, the vehicle control device 11 and the positioning device 16 may be wirelessly communicable.

The communication unit 15 is a communication interface that connects the work vehicle 10 to the communication network N1 wiredly or wirelessly, and performs data communication with an external device such as the operation terminal 20 via the communication network N1 in accordance with a predetermined communication protocol. The work vehicle 10 can perform wireless communication with the operation terminal 20 via the communication unit 15.

The storage unit 12 is a non-volatile storage unit such as a hard disk drive (HDD) or a solid state drive (SSD) that stores various pieces of information. The storage unit 12 stores a control program such as an automatic traveling program for allowing the vehicle control device 11 to perform automatic traveling processing. For example, the automatic traveling program is non-transitorily recorded in a computer-readable recording medium such as a flash ROM, an EEPROM, a CD, or a DVD, read by a predetermined reading device (not illustrated), and stored in the storage unit 12. Note that, the automatic traveling program may be downloaded from a server (not illustrated) to the work vehicle 10 via the communication network N1, and stored in the storage unit 12. Also, the storage unit 12 may store route data on the target route R to be generated in the operation terminal 20.

The traveling device 13 is a driving unit that causes the work vehicle 10 to travel. As illustrated in FIG. 2, the traveling device 13 includes an engine 131, front wheels 132, rear wheels 133, a transmission 134, a front axle 135, a rear axle 136, a steering wheel 137, and the like. Note that, the front wheel 132 and the rear wheel 133 are provided on each of left and right sides of the work vehicle 10. Further, the traveling device 13 is not limited to a wheel type in which the front wheels 132 and the rear wheels 133 are provided, but may be a crawler type in which a crawler is provided on left and right sides of the work vehicle 10.

The engine 131 is a drive source such as a diesel engine or a gasoline engine that is driven by using fuel to be replenished in an unillustrated fuel tank. The traveling device 13 may include an electric motor as a drive source along with the engine 131 or in place of the engine 131. Note that, the engine 131 is connected to an unillustrated generator, and electric power is supplied from the generator to an electrical component such as the vehicle control device 11 provided in the work vehicle 10, a battery, and the like. Note that, the battery is charged by electric power to be supplied from the generator. Further, electrical components such as the vehicle control device 11 and the positioning device 16 provided in the work vehicle 10 can also be driven by electric power to be supplied from the battery even after the engine 131 is stopped.

A driving force of the engine 131 is transmitted to the front wheels 132 via the transmission 134 and the front axle 135, and is transmitted to the rear wheels 133 via the transmission 134 and the rear axle 136. The driving source of the engine 131 is also transmitted to the work machine 14 via a PTO shaft (not illustrated). In a case where the work vehicle 10 performs automatic traveling, the traveling device 13 performs a traveling operation in accordance with a command of the vehicle control device 11.

The work machine 14 is, for example, a cultivator, a mower, a plow, a fertilizer applicator, a seeder, a sprayer, and the like, and is detachably attachable to the work vehicle 10. This allows the work vehicle 10 to perform various works by using each work machine 14. FIG. 2 illustrates a case in which the work machine 14 is a cultivator.

The work machine 14 may be supported in the work vehicle 10 in such a way as to be raised and lowered by an unillustrated elevating mechanism. The vehicle control device 11 can raise and lower the work machine 14 by controlling the elevating mechanism. For example, in a case where the work vehicle 10 travels straight ahead in a forward direction in the inner area Fa and the headland area Fb of the field F, the vehicle control device 11 lowers the work machine 14, and in a case where the work vehicle 10 travels straight ahead in a backward direction, and makes a turn in the inner area Fa and the headland area Fb of the field F, the vehicle control device 11 raises the work machine 14. In addition, in a case where the vehicle control device 11 acquires an instruction to stop the work, the vehicle control device 11 outputs, to the work machine 14, a command to stop the work. For example, in a case where the operator performs an operation of instructing to stop on the operation terminal 20, the vehicle control device 11 acquires the stop instruction from the operation terminal 20. When the vehicle control device 11 acquires the instruction to stop the work, the vehicle control device 11 stops driving the PTO shaft, and stops the work of the work machine 14.

The steering wheel 137 is an operation unit to be operated by the operator or the vehicle control device 11. For example, in the traveling device 13, in response to an operation of the steering wheel 137 by the vehicle control device 11, an angle of the front wheels 132 is changed by an unillustrated hydraulic power steering mechanism, and a traveling direction of the work vehicle 10 is changed. In a case where the operator performs a teaching operation (details are described later) at a time of registering the field F, the operator operates the steering wheel 137, and manually travels the work vehicle 10.

Further, the traveling device 13 includes, in addition to the steering wheel 137, an unillustrated shift lever, accelerator, brake, and the like to be operated by the vehicle control device 11. In the traveling device 13, a gear of the transmission 134 is switched to a forward gear, a backward gear, or the like in response to an operation of the shift lever by the vehicle control device 11, and a traveling mode of the work vehicle 10 is switched to forward, backward, and the like. The vehicle control device 11 also controls a speed of the engine 131 by operating the accelerator. The vehicle control device 11 also operates the brake, and brakes rotation of the front wheels 132 and the rear wheels 133 by using an electromagnetic brake.

The positioning device 16 is a communication device including a positioning control unit 161, a storage unit 162, a communication unit 163, a positioning antenna 164, and the like. For example, as illustrated in FIG. 2, the positioning device 16 is provided on an upper portion of a cabin 138 in which the operator boards. An installation location of the positioning device 16 is not limited to the cabin 138. Furthermore, the positioning control unit 161, the storage unit 162, the communication unit 163, and the positioning antenna 164 of the positioning device 16 may be disposed in a distributed manner at different positions in the work vehicle 10. Note that, as described above, the battery is connected to the positioning device 16, and the positioning device 16 is operable even when the engine 131 is stopped. Also, for example, a mobile phone terminal, a smartphone, a tablet terminal, or the like may be substituted as the positioning device 16.

The positioning control unit 161 is a computer system including one or more processors, and a storage memory such as a nonvolatile memory and a RAM. The storage unit 162 is a nonvolatile memory or the like that stores a program for causing the positioning control unit 161 to perform positioning processing, and data such as positioning information and movement information. For example, the program is non-transitorily recorded in a computer-readable recording medium such as a flash ROM, an EEPROM, a CD, or a DVD, read by a predetermined reading device (not illustrated), and stored in the storage unit 162. Note that, the program may be downloaded from a server (not illustrated) to the positioning device 16 via the communication network N1, and stored in the storage unit 162.

The communication unit 163 is a communication interface that connects the positioning device 16 to the communication network N1 wiredly or wirelessly, and performs data communication with an external device such as a base station (not illustrated) via the communication network N1 in accordance with a predetermined communication protocol.

The positioning antenna 164 is an antenna that receives a radio wave (GNSS signal) to be transmitted from a satellite.

The positioning control unit 161 computes a current position of the work vehicle 10, based on a GNSS signal to be received from a satellite by the positioning antenna 164.

For example, in a case where the work vehicle 10 automatically travels in the field F, and the positioning antenna 164 receives a radio wave (such as a transmission time, and orbit information) to be transmitted from each of a plurality of satellites, the positioning control unit 161 computes a distance between the positioning antenna 164 and each satellite, and computes a current position (a latitude and a longitude) of the work vehicle 10, based on the computed distance. The positioning control unit 161 also computes a current position of the work vehicle 10 by utilizing correction information associated with a base station (reference station) near the work vehicle 10. Positioning by a real-time kinematic method (RTK-GPS positioning method (RTK method)) may also be performed. In this way, the work vehicle 10 performs automatic traveling by utilizing positioning information by the RTK method. Note that, a current position of the work vehicle 10 may be the same position as the positioning position (e.g., a position of the positioning antenna 164), or may be a position deviated from the positioning position.

Herein, positioning accuracy of positioning varies depending on a positioning state. The positioning state indicates a receiving state, in the positioning device 16, of a GNSS signal to be transmitted from a satellite, and, for example, as the number of satellites capable of receiving a GNSS signal increases, the positioning state becomes better (high accuracy state). For example, when the number of satellites capable of receiving a GNSS signal decreases due to presence of an obstacle such as a windbreak or a building near the field F, the positioning state is lowered. When the positioning state is lowered, and the positioning accuracy becomes less than a predetermined level, the work vehicle 10 is brought to a state in which the operation terminal 20 cannot acquire the position information from the work vehicle 10.

The vehicle control device 11 includes a control device such as a CPU, a ROM, and a RAM. The CPU is a processor that executes various pieces of arithmetic processing. The ROM is a non-volatile storage unit that stores in advance a control program such as a BIOS and an OS for causing the CPU to execute various pieces of arithmetic processing. The RAM is a volatile or non-volatile storage unit that stores various pieces of information, and is used as a temporary storage memory (work area) in which the CPU executes various pieces of processing. Further, the vehicle control device 11 controls the work vehicle 10 by causing the CPU to execute various control programs stored in advance in the ROM or the storage unit 12.

The vehicle control device 11 controls an operation of the work vehicle 10 in response to various operations with respect to the work vehicle 10 by the user. The vehicle control device 11 also performs automatic traveling processing of the work vehicle 10, based on a current position of the work vehicle 10 to be computed by the positioning device 16, and the target route R that is set in advance.

As illustrated in FIG. 1, the vehicle control device 11 includes various processing units such as a traveling processing unit 111. Note that, the vehicle control device 11 functions as the various processing units by causing the CPU to execute various pieces of processing according to the automatic traveling program. Also, a part or all of the processing units may be constituted of an electronic circuit. Note that, the automatic traveling program may be a program for causing a plurality of processors to function as the processing units.

The traveling processing unit 111 controls traveling of the work vehicle 10. Specifically, when the traveling processing unit 111 acquires an instruction to start traveling from the operation terminal 20, the traveling processing unit 111 causes the work vehicle 10 to start automatic traveling. For example, when the operator presses a start button on an operation screen of the operation terminal 20, the operation terminal 20 outputs, to the work vehicle 10, an instruction to start traveling. When the traveling processing unit 111 acquires, from the operation terminal 20, an instruction to start traveling, the traveling processing unit 111 causes the work vehicle 10 to start automatic traveling. This allows the work vehicle 10 to start automatic traveling along the target route R (see FIG. 3) in the field F, and a work by the work machine 14 is started. Note that, the target route R along which the work vehicle 10 automatically travels is generated, for example, in the operation terminal 20. The work vehicle 10 acquires route data associated with the target route R from the operation terminal 20, and automatically travels along the target route R.

Further, when the traveling processing unit 111 acquires, from the operation terminal 20, an instruction to stop traveling, the traveling processing unit 111 causes the work vehicle 10 to stop automatic traveling. For example, when the operator presses a stop button on an operation screen of the operation terminal 20, the operation terminal 20 outputs, to the work vehicle 10, an instruction to stop traveling.

Further, in a case where the work vehicle 10 detects an obstacle, the traveling processing unit 111 causes the work vehicle 10 to stop automatic traveling. For example, in a case where an obstacle detection device (not illustrated) loaded in the work vehicle 10 detects an obstacle within a range from 3 m to 8 m in front of the work vehicle 10, the traveling processing unit 111 decelerates the work vehicle 10. Also, in a case where the obstacle detection device detects an obstacle within a range up to 3 m in front of the work vehicle 10, the traveling processing unit 111 causes the work vehicle 10 to stop.

[Operation Terminal 20]

As illustrated in FIG. 1, the operation terminal 20 is an information processing device including an operation control unit 21, a storage unit 22, an operation display unit 23, a communication unit 24, and the like. The operation terminal 20 may be constituted of a mobile terminal such as a tablet terminal, a smartphone, or the like.

The communication unit 24 is a communication interface that connects the operation terminal 20 to the communication network N1 wiredly or wirelessly, and performs data communication with an external device such as one or more work vehicles 10 via the communication network N1 in accordance with a predetermined communication protocol.

The operation display unit 23 is a user interface including a display unit such as a liquid crystal display or an organic EL display that displays various pieces of information, and an operation unit such as a touch panel that accepts an operation, a mouse, or a keyboard. An operator can perform, on an operation screen to be displayed on the display unit, an operation of registering various pieces of information (such as work vehicle information, field information, and work information to be described later) by operating the operation unit. For example, the operator performs, on the operation unit, an operation of registering the field F as a work target.

The operator can also perform an instruction to start traveling, an instruction to stop traveling, and the like with respect to the work vehicle 10 by operating the operation unit. Furthermore, the operator can recognize, at a position away from the work vehicle 10, a traveling state of the work vehicle 10 that automatically travels in the field F along the target route R by means of a traveling trajectory to be displayed on the operation terminal 20.

The storage unit 22 is a non-volatile storage unit such as an HDD or an SSD that stores various pieces of information. The storage unit 22 stores a control program such as a field registration program for causing the operation control unit 21 to perform field registration processing (see FIG. 11) to be described later. For example, the field registration program is non-transitorily recorded in a computer-readable recording medium such as a flash ROM, an EEPROM, a CD, or a DVD, read by a predetermined reading device (not illustrated), and stored in the storage unit 22. Note that, the field registration program may be downloaded from a server (not illustrated) to the operation terminal 20 via the communication network N1, and stored in the storage unit 22.

In addition, a dedicated application for causing the work vehicle 10 to automatically travel is installed in the storage unit 22. The operation control unit 21 activates the dedicated application, and performs setting processing on various pieces of information related to the work vehicle 10, generation processing of the target route R of the work vehicle 10, an instruction to the work vehicle 10 to automatically travel, and the like.

In addition, the storage unit 22 stores data such as work vehicle information being information related to the work vehicle 10, and target route information being information related to the target route R. The work vehicle information includes information such as a vehicle number and a model number for each work vehicle 10. The vehicle number is identification information of the work vehicle 10. The model number is a model number of the work vehicle 10.

Note that, the storage unit 22 may store the work vehicle information related to one work vehicle 10, or may store the work vehicle information related to a plurality of work vehicles 10. For example, in a case where a specific operator owns a plurality of work vehicles 10, the work vehicle information related to each work vehicle 10 is stored in the storage unit 22.

The target route information includes information such as a route name, a field name, an address, a field area, and a work time for each target route R. The route name is a route name of the target route R generated in the operation terminal 20. The field name is a name of the field F as a work target, for which the target route R is set. The address is an address of the field F. The field area is an area of the field F. The work time is a time required for a work in the field F by the work vehicle 10.

Note that, the storage unit 22 may store the target route information related to one target route R, or may store the target route information related to a plurality of target routes R. For example, in a case where a specific operator generates a plurality of target routes R with respect to one or more fields F owned by himself/herself, the storage unit 22 stores the target route information related to each target route R. Note that, one target route R may be set for one field F, or a plurality of target routes R may be set for one field F.

Note that, as another embodiment, a part or all of pieces of information such as the work vehicle information and the target route information may be stored in a server accessible from the operation terminal 20. The operator may perform an operation of registering the work vehicle information and the target route information in the server (e.g., a personal computer, a cloud server, or the like). In this case, the operation control unit 21 may acquire the information from the server, and perform each piece of processing, such as field registration processing (see FIG. 11) to be described later.

The operation control unit 21 includes a control device such as a CPU, a ROM, and a RAM. The CPU is a processor that executes various pieces of arithmetic processing. The ROM is a non-volatile storage unit that stores in advance a control program such as a BIOS and an OS for causing the CPU to execute various pieces of arithmetic processing. The RAM is a volatile or non-volatile storage unit that stores various pieces of information, and is used as a temporary storage memory for various pieces of processing to be executed by the CPU. Further, the operation control unit 21 controls the operation terminal 20 by causing the CPU to execute various control programs stored in advance in the ROM or the storage unit 22.

As illustrated in FIG. 1, the operation control unit 21 includes a setting processing unit 211, an acceptance processing unit 212, an acquisition processing unit 213, a recording processing unit 214, a determination processing unit 215, and a notification processing unit 216. Note that, the operation control unit 21 functions as the various processing units by causing the CPU to execute various pieces of processing in accordance with the control program. Also, a part or all of the processing units may be constituted of an electronic circuit. Note that, the control program may be a program for causing a plurality of processors to function as the processing units.

The setting processing unit 211 sets information related to the work vehicle 10 (hereinafter, referred to as "work vehicle information"), information related to the field F (hereinafter, referred to as "field information"), and information as to how a work is specifically performed (hereinafter, referred to as "work information"). The setting processing unit 211 accepts a setting operation by the operator on a menu screen D1 illustrated in FIG. 4, for example, and registers each piece of setting information. The setting processing unit 211 is an example of a registration processing unit of the present invention.

Specifically, regarding information on a model of the work vehicle 10, a position where the positioning antenna 164 is mounted on the work vehicle 10, a type of the work machine 14, a size and a shape of the work machine 14, a position of the work machine 14 with respect to the work vehicle 10, a vehicle speed and an engine speed of the work vehicle 10 during a work, a vehicle speed and an engine speed of the work vehicle 10 during turning, and the like, the setting processing unit 211 sets the information by performing a registration operation on the operation terminal 20 by the operator.

The setting processing unit 211 also sets information on a position and a shape of the field F, the work start position S (traveling start position) at which a work is started, the work finish position G (traveling finish position) at which the work is finished, a working direction, and the like by performing a registration operation on the operation terminal 20.

Information on a position and a shape of the field F can be automatically acquired, for example, by allowing the operator to board the work vehicle 10, drive the work vehicle 10 in such a way as to travel around along an outer periphery of an area to be registered, and then, recording a transition of position information of the positioning antenna 164 at that time. The area to be specified by the acquired position and shape of the field F is an area (traveling area) in which the work vehicle 10 is allowed to travel. For example, the setting processing unit 211 registers field information on the field F illustrated in FIG. 3.

The setting processing unit 211 is also configured in such a way that, as work information, presence or absence of a cooperative work by a work vehicle 10 (unmanned tractor) and a manned work vehicle 10, the number of skips, which is the number of work routes to be skipped in a case where the work vehicle 10 travels around in a headland, a width of a headland, a width of a non-cultivated field, and the like are settable.

The setting processing unit 211 also generates the target route R along which the work vehicle 10 is caused to automatically travel in the field F, based on each piece of the setting information. Specifically, the setting processing unit 211 generates the target route R in the field F, based on the work start position S and the work finish position G registered in field settings. For example, as illustrated in FIG. 3, the setting processing unit 211 generates the target route R including the work start position S, the work finish position G, the inner work route Ra, and the headland work route Rb, based on a setting operation by the operator. The setting processing unit 211 registers the generated target route R in association with the field F.

Herein, the operation control unit 21 registers the field F, based on an operation by the operator, as described in the following.

Figure 4:
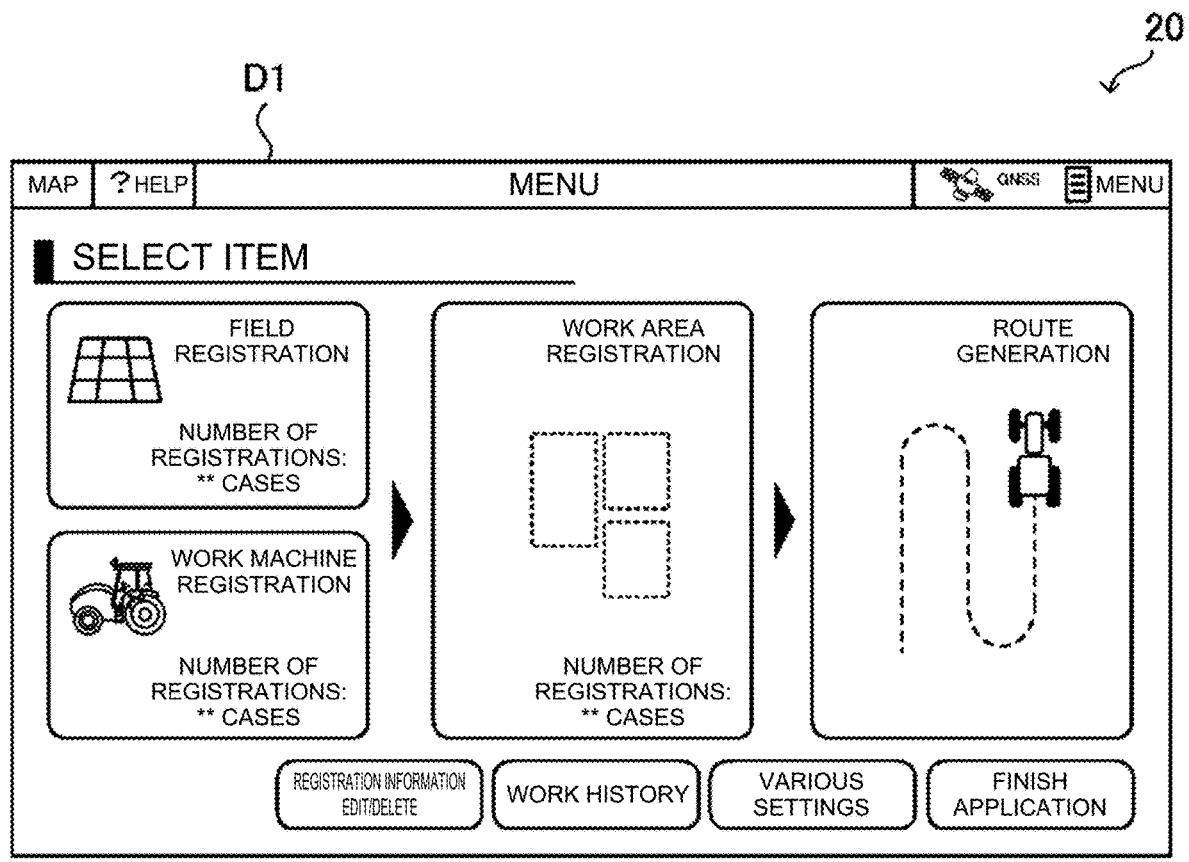
FIG. 4 is a diagram illustrating an example of a menu screen to be displayed on an operation terminal according to the embodiment of the present invention.
Figure 5:
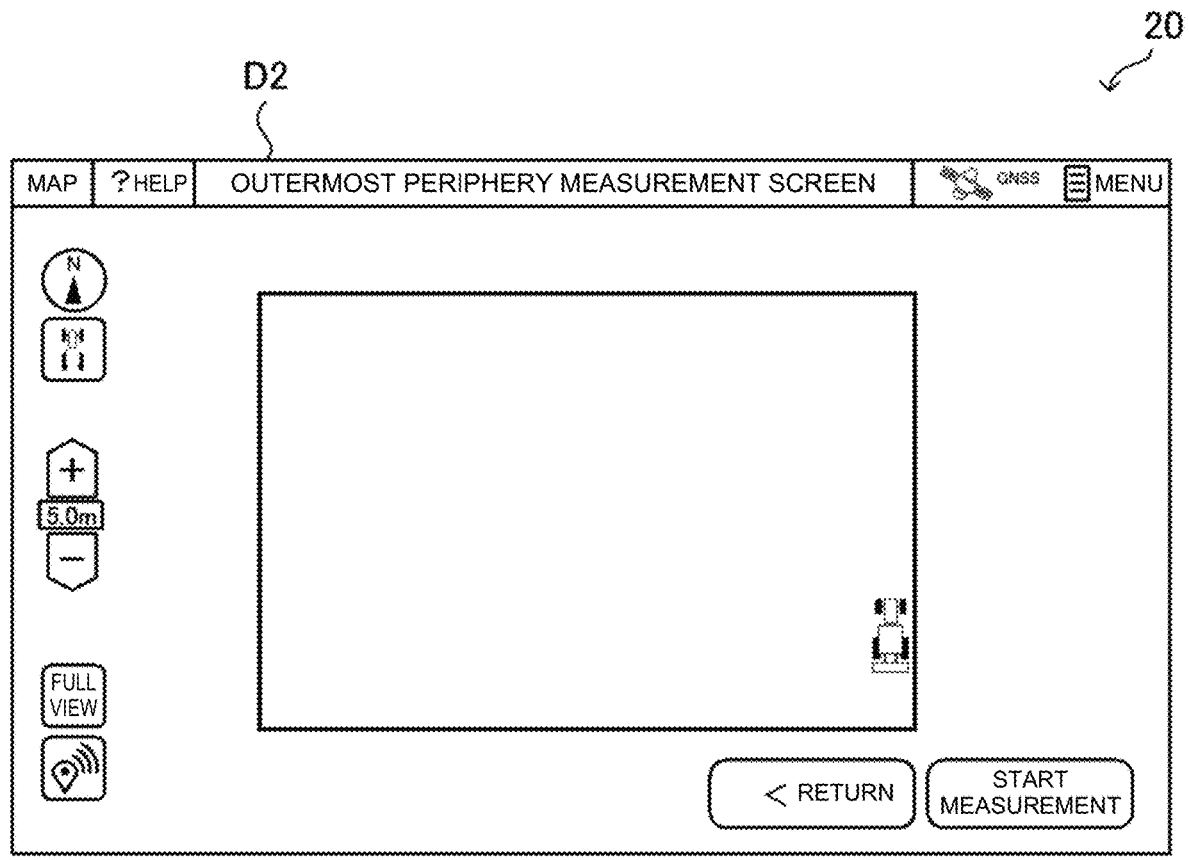
FIG. 5 is a diagram illustrating an example of a field measurement screen to be displayed on the operation terminal according to the embodiment of the present invention.
Figure 6:
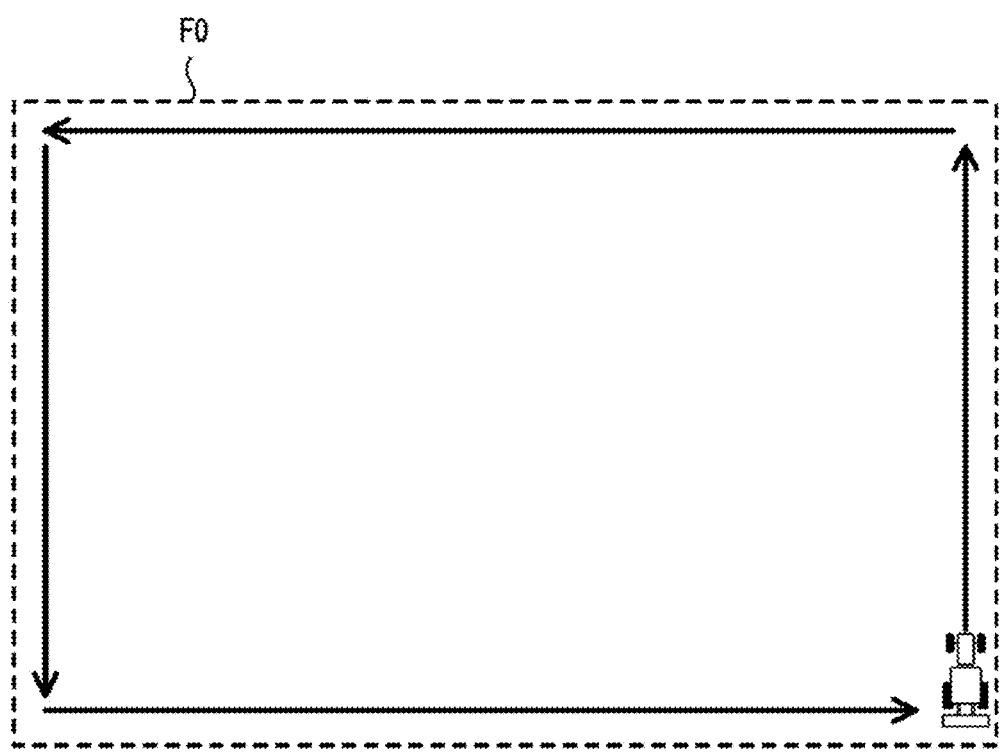
FIG. 6 is a diagram illustrating an example of teaching traveling of the work vehicle according to the embodiment of the present invention.

Specifically, the acceptance processing unit 212 accepts an operation of selecting "field registration" from the operator on the menu screen D1 (see FIG. 4). When the acceptance processing unit 212 accepts the selection operation of "field registration", the operation control unit 21 proceeds to a field registration mode for registering a field. When the operation control unit 21 proceeds to the field registration mode, the operation control unit 21 causes the operation display unit 23 to display a field measurement screen D2 (see FIG. 5). The operator selects "start measurement" on the field measurement screen D2, and performs teaching traveling. Specifically, as illustrated in FIG. 6, the operator boards the work vehicle 10, and drives in such a way as to travel around along an outer periphery of an area F0 to be registered.

The acquisition processing unit 213 acquires position information of the work vehicle 10 traveling in the predetermined area F0 in response to a traveling operation by the operator. Specifically, when the operator is driving the work vehicle 10, the positioning device 16 computes a current position of the work vehicle 10 at a predetermined cycle, and transmits, to the operation terminal 20, position information on the computed current position.

When the acquisition processing unit 213 acquires the position information from the work vehicle 10, the recording processing unit 214 records, in the storage unit 22, the position information, as a traveling trajectory of the work vehicle 10 in the predetermined area F0. The recording processing unit 214 records in the storage unit 22, each time the acquisition processing unit 213 acquires the position information.

Further, on the field measurement screen D2 (see FIG. 7), the operation control unit 21 causes to display a position (each circle point in FIG. 7) associated with the position information on a map, and causes to display a message H1 ("measurement in progress") indicating that recording processing of recording the position information is being performed. This allows the operator to recognize that position information of the work vehicle 10 is successfully acquired, and recording processing is being performed.

The determination processing unit 215 determines whether the work vehicle 10 is in a state in which the position information can be acquired during traveling of the teaching traveling. Specifically, the determination processing unit 215 determines whether the work vehicle 10 is in a state in which the position information can be acquired based on the positioning state (positioning accuracy). In a case where the positioning accuracy is equal to or more than a predetermined level, the determination processing unit 215 determines that the work vehicle 10 is in a state in which the position information can be acquired, and in a case where the positioning accuracy is below the predetermined level, the determination processing unit 215 determines that the work vehicle 10 is in a state in which the position information cannot be acquired.

In a case where the determination processing unit 215 determines that the work vehicle 10 is in a state in which the position information cannot be acquired, the recording processing unit 214 temporarily stops recording processing of recording the position information. In other words, the recording processing unit 214 performs the recording processing, in a case where the acquisition processing unit 213 acquires the position information from the work vehicle 10, and temporarily stops (suspends) the recording processing, in a case where the work vehicle 10 is brought to a state in which the position information cannot be acquired. In a case where the recording processing is temporarily stopped, a state (standby state for the recording processing) after measurement by the teaching traveling is started is maintained.

In a case where the work vehicle 10 is brought to a state in which the position information cannot be acquired, the notification processing unit 216 notifies the operator of the state. For example, the notification processing unit 216 causes to display, on the field measurement screen D2 (see FIG. 8A), a message M1 indicating that communication between the operation terminal 20 and the work vehicle 10 is lost.

In addition, the notification processing unit 216 notifies the operator of information indicating that the recording processing is temporarily stopped. For example, when the operator presses an "OK" button on the message M1 illustrated in FIG. 8A, the operation control unit 21 causes to display the field measurement screen D2 illustrated in FIG. 8B. Note that, the operation control unit 21 may cause to automatically display the field measurement screen D2 illustrated in FIG. 8B without accepting a pressing operation of the "OK" button on the message M1 by the operator. For example, the operation control unit 21 may cause to automatically display the field measurement screen D2 illustrated in FIG. 8B when a few seconds elapse after the message M1 is displayed on the field measurement screen D2. In other words, in a case where communication is lost, the operation control unit 21 may perform screen transition processing, based on an operation by the operator (user operation), or may automatically perform screen transition processing without depending on an operation by the operator. As another embodiment, the notification processing unit 216 may cause to display the field measurement screen D2 illustrated in FIG. 8B, based on a condition that the work vehicle 10 is brought to a state in which the position information cannot be acquired. The notification processing unit 216 may also cause to display, on the field measurement screen D2 (see FIG. 8B), a position associated with the acquired position information on a map, and cause to display a message H2 ("measurement stopped") indicating that the recording processing is temporarily stopped.

This allows the operator to recognize that position information of the work vehicle 10 is no longer acquired normally, and that the recording processing is temporarily stopped. In this case, for example, the operator suspends manual traveling, and stops the work vehicle 10.

Herein, the operation control unit 21 resumes the recording processing, in a case where the work vehicle 10 is restored to a state in which the position information can be acquired after the recording processing is temporarily stopped. For example, when the positioning accuracy is restored to a predetermined level or more, the acquisition processing unit 213 resumes acquiring the position information, and the recording processing unit 214 resumes the recording processing of recording the position information. The recording processing unit 214 records position information recorded before the recording processing is temporarily stopped, and then, records the position information after resuming.

In addition, in a case where the work vehicle 10 is restored to a state in which the position information can be acquired after the recording processing is temporarily stopped, the notification processing unit 216 causes to display, on the field measurement screen D2 (see FIG. 9), a message M2 indicating that communication between the operation terminal 20 and the work vehicle 10 is restored. When the operator presses the "OK" button on the message M2 illustrated in FIG. 9, and resumes manual traveling of the work vehicle 10, the acquisition processing unit 213 resumes acquiring the position information, and the recording processing unit 214 resumes the recording processing. The operation control unit 21 causes to display, on the field measurement screen D2, a position associated with the position information on a map, and also switches a message from the message H2 ("measurement stopped" in FIG. 8B) to the message H1 ("measurement in progress" in FIG. 7). Note that, the operation control unit 21 may automatically cause to display the field measurement screen D2 illustrated in FIG. 7 without accepting a pressing operation of the "OK" button on the message M2 by the operator. For example, the operation control unit 21 may automatically cause to display the field measurement screen D2 illustrated in FIG. 7 when a few seconds elapse after the message M2 is displayed on the field measurement screen D2. In other words, in a case where communication is restored, the operation control unit 21 may perform screen transition processing, based on an operation by the operator (user operation), or may automatically perform screen transition processing without depending on an operation by the operator.

When the operator completes outer periphery traveling, the operator presses a "measurement completion" button (see FIG. 7 and the like) on the field measurement screen D2. When the operator presses the "measurement completion" button, the operation control unit 21 causes to display a field registration screen D3 illustrated in FIG. 10. The operation control unit 21 causes to display, on the field registration screen D3, positions associated with all pieces of position information acquired by outer periphery traveling on a map, and also causes to display an area of a shape recognized based on the position information. The operator confirms the displayed area, and presses a "register" button. When the operator presses the "register" button, the setting processing unit 211 registers the area, as the field F.

Figure 10:
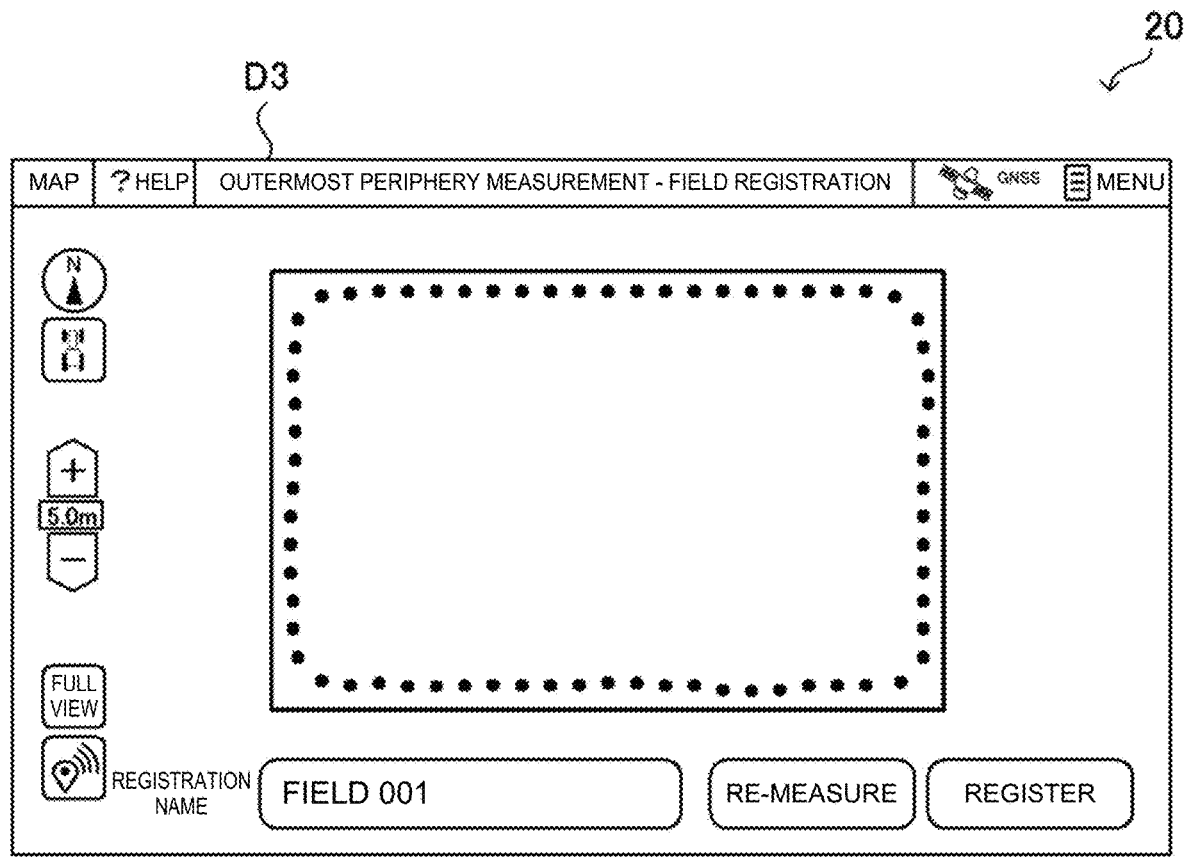
FIG. 10 is a diagram illustrating an example of a field registration screen to be displayed on the operation terminal according to the embodiment of the present invention.

As described above, the setting processing unit 211 registers the field F, based on the position information to be acquired from the work vehicle 10. The operation control unit 21 generates the target route R along which the work vehicle 10 is caused to automatically travel in the registered field F. Specifically, in a case where the field F illustrated in FIG. 10 is registered, as illustrated in FIG. 3, the operation control unit 21 generates the target route R including the inner work route Ra along which the work vehicle 10 is caused to travel back and forth in the inner area Fa, and the headland work route Rb along which the work vehicle 10 is caused to travel around in the headland area Fb.

When the operation control unit 21 generates the target route R, the operation control unit 21 outputs, to the work vehicle 10, route data on the target route R.

The work vehicle 10 is configured in such a way that route data on the target route R generated by the operation terminal 20 are transferred to the work vehicle 10 and stored in the storage unit 12, and the work vehicle 10 can autonomously travel along the target route R while detecting a current position of the work vehicle 10 by the positioning antenna 164. Note that, a current position of the work vehicle 10 usually coincides with a position of the positioning antenna 164.

Further, the work vehicle 10 is configured in such a way as to be able to automatically travel in the field F, in a case where a current position coincides with the work start position S (see FIG. 3) in the field F. For example, in a case where a current position coincides with the work start position S in the field F, and the operator presses the start button on the operation screen (not illustrated), and an instruction to start traveling is given, the work vehicle 10 starts automatic traveling along the target route R by the traveling processing unit 111 of the work vehicle 10.

The traveling processing unit 111 causes the work vehicle 10 to automatically travel from the work start position S to the work finish position G along the target route R in the field F (see FIG. 3). When the work vehicle 10 is automatically traveling, the operator can recognize a traveling state in the field F on the operation terminal 20.

Note that, the operation terminal 20 may be accessible to a website (agricultural support site) of agricultural support services provided by a server (not illustrated) via the communication network N1. In this case, the operation terminal 20 is able to function as an operation terminal for the server by causing the operation control unit 21 to execute a browser program. Further, the server includes each processing unit described above, and performs each piece of processing.

[Field Registration Processing]

Figure 11:
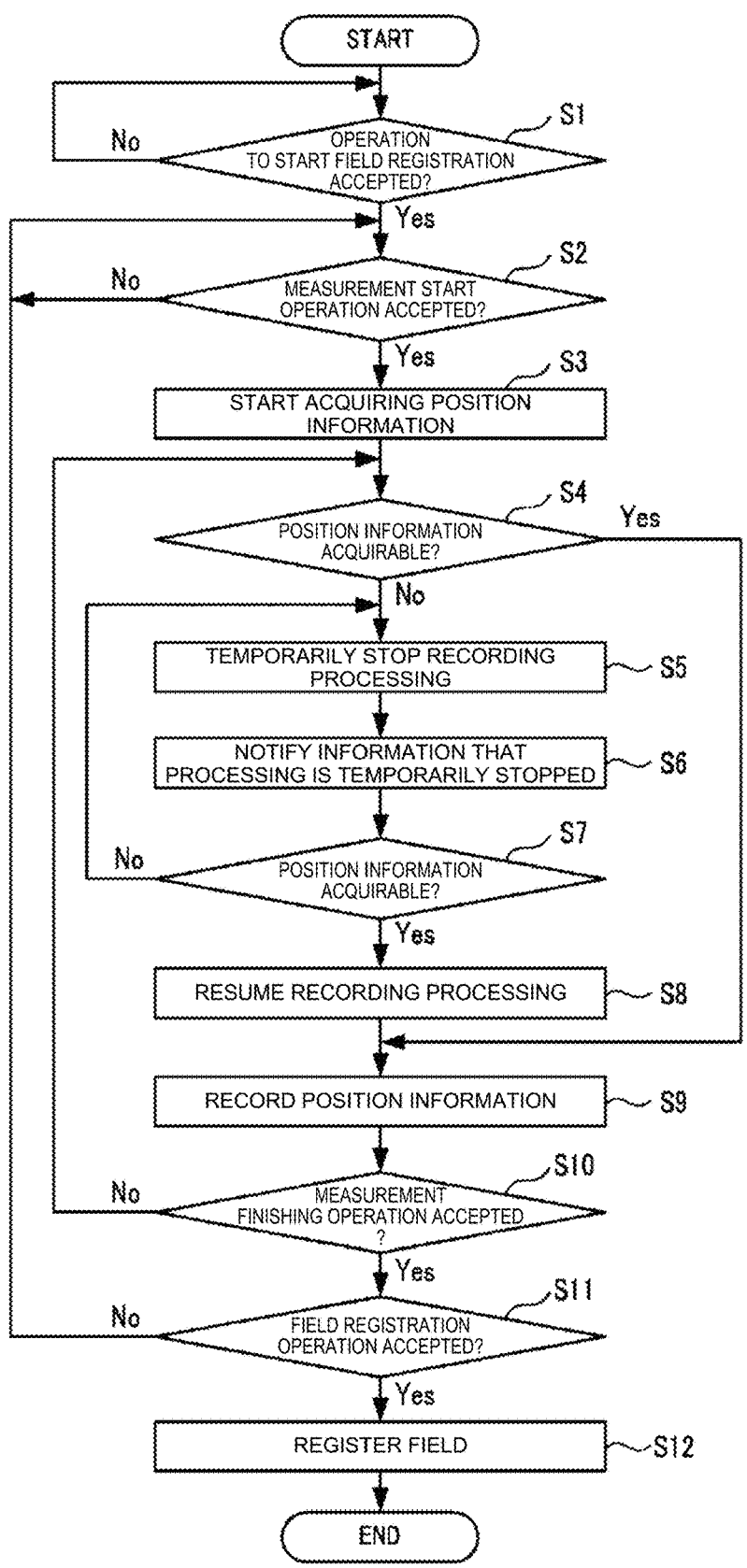
FIG. 11 is a flowchart illustrating an example of a procedure of field registration processing to be performed by the automatic traveling system according to the embodiment of the present invention.

In the following, an example of the field registration processing to be performed by the automatic traveling system 1 is described with reference to FIG. 11.

Note that, the present invention can be described as an invention directed to a field registration method in which one or more steps included in the field registration processing are executed. Further, one or more steps included in the field registration processing described herein may be omitted as appropriate. Note that, the order of execution of each step in the field registration processing may be different, as far as similar advantageous effects are generated. Furthermore, although a case is described herein as an example, in which the operation control unit 21 executes each step in the field registration processing, a field registration method in which one or more processors execute each step in the field registration processing in a distributed manner is also considered as another embodiment.

First, in step S1, the operation control unit 21 of the operation terminal 20 determines whether a start operation of starting field registration is accepted from the operator. When the operation control unit 21 accepts the start operation (S1: Yes), the operation control unit 21 proceeds the processing to step S2. The operation control unit 21 waits until the start operation is accepted (S1: No). For example, when the operator selects "field registration" on the menu screen D1 (see FIG. 4), the operation control unit 21 accepts the start operation. When the operation control unit 21 accepts the start operation, the operation control unit 21 causes to display the field measurement screen D2 (see FIG. 5).

In step S2, the operation control unit 21 determines whether a measurement start operation (teaching start operation) is accepted from the operator. When the operation control unit 21 accepts the measurement start operation (S2: Yes), the operation control unit 21 proceeds the processing to step S3. The operation control unit 21 waits until the measurement start operation is accepted (S2: No). For example, when the operator selects "start measurement" on the field 2R measurement screen D2 (see FIG. 5), the operation control unit 21 accepts the measurement start operation. Upon accepting the measurement start operation, the operation control unit 21 causes to display the field measurement screen D2 illustrated in FIG. 7, and permits manual traveling by the operator. The operator boards the work vehicle 10, and starts teaching traveling of traveling around along an outer periphery of the area F0 (see FIG. 6) to be registered.

In step S3, the operation control unit 21 starts processing of acquiring position information of the work vehicle 10. Specifically, when the work vehicle 10 starts traveling in response to an operation by the operator, the positioning device 16 transmits, to the operation terminal 20, position information on a current position of the work vehicle 10. The operation control unit 21 starts processing of acquiring position information from the work vehicle 10 at a predetermined cycle.

Next, in step S4, the operation control unit 21 determines whether the work vehicle 10 is in a state in which the position information can be acquired during traveling of teaching traveling. Specifically, the operation control unit 21 determines whether the work vehicle 10 is in a state in which the position information can be acquired based on the positioning state (positioning accuracy). For example, in a case where the positioning accuracy is equal to or more than a predetermined level, the operation control unit 21 determines that the work vehicle 10 is in a state in which the position information can be acquired, and in a case where the positioning accuracy is below the predetermined level, the operation control unit 21 determines that the work vehicle 10 is in a state in which the position information cannot be acquired.

In a case where the operation control unit 21 determines that the work vehicle 10 is in a state in which the position information can be acquired (S4: Yes), the operation control unit 21 proceeds the processing to step S9. When the processing is proceeded to step S9, the operation control unit 21 stores, in the storage unit 22, the position information acquired from the work vehicle 10.

On the other hand, in a case where the operation control unit 21 determines that the work vehicle 10 is in a state in which the position information cannot be acquired (S4: No), the operation control unit 21 proceeds the processing to step S5. In step S5, the operation control unit 21 temporarily stops recording processing of recording the position information.

In step S6, the operation control unit 21 notifies the operator of information indicating that the recording processing is temporarily stopped. Specifically, in a case where the work vehicle 10 is brought to a state in which the position information cannot be acquired, the operation control unit 21 notifies the operator of the state. For example, the operation control unit 21 causes to display, on the field measurement screen D2 (see FIG. 8A), the message M1 indicating that communication between the operation terminal 20 and the work vehicle 10 is lost. Also, when the operator presses the "OK" button on the message M1 illustrated in FIG. 8A, the operation control unit 21 causes to display the field measurement screen D2 illustrated in FIG. 8B. The operation control unit 21 causes to display, on the field measurement screen D2 (see FIG. 8B), a position associated with the acquired position information on a map, and causes to display the message H2 ("measurement stopped") indicating that the recording processing is temporarily stopped.

In step S7, the operation control unit 21 determines whether the work vehicle 10 is restored to a state in which the position information can be acquired. In a case where the positioning accuracy becomes equal to or more than a predetermined level, the operation control unit 21 determines that the work vehicle 10 is restored to a state in which the position information can be acquired, and in a case where the positioning accuracy is below the predetermined level, the operation control unit 21 determines that the work vehicle 10 is still in a state in which the position information still cannot be acquired.

When the work vehicle 10 is restored to a state in which the position information can be acquired after the recording processing is temporarily stopped, the operation control unit 21 causes to display, on the field measurement screen D2 (see FIG. 9), the message M2 indicating that communication between the operation terminal 20 and the work vehicle 10 is restored.

In a case where the operation control unit 21 determines that the work vehicle 10 is restored to a state in which the position information can be acquired (S7: Yes), the operation control unit 21 proceeds the processing to step S8. On the other hand, in a case where the operation control unit 21 determines that the work vehicle 10 is still in a state in which the position information cannot be acquired (S7: No), the operation control unit 21 proceeds the processing to step S5, and maintains a state in which the recording processing is temporarily stopped.

In step S8, the operation control unit 21 resumes the recording processing. Specifically, the operation control unit 21 resumes processing of acquiring the position information from the work vehicle 10. For example, when the operator presses the "OK" button on the message M2 illustrated in FIG. 9, and resumes manual traveling of the work vehicle 10, the operation control unit 21 resumes acquiring the position information, and resumes the recording processing.

In step S9, the operation control unit 21 stores, in the storage unit 22, the position information acquired from the work vehicle 10. Also, the operation control unit 21 causes to display, on the field measurement screen D2, a position associated with the position information on a map, and causes to display the message H1 ("measurement in progress" in FIG. 7).

In step S10, the operation control unit 21 determines whether a measurement finishing operation (teaching finishing operation) is accepted from the operator. When the operation control unit 21 accepts the measurement finishing operation (S10: Yes), the operation control unit 21 proceeds the processing to step S11. The operation control unit 21 repeats the pieces of processing from steps S4 to S10 until the measurement finishing operation is accepted (S10: No). For example, when the operator presses the "measurement completion" button on the field measurement screen D2, the operation control unit 21 accepts the measurement finishing operation. When the operation control unit 21 accepts the measurement finishing operation, the operation control unit 21 causes to display the field registration screen D3 illustrated in FIG. 10.

In step S11, the operation control unit 21 determines whether a field registration operation is accepted from the operator. When the operation control unit 21 accepts the field registration operation (S11: Yes), the operation control unit 21 proceeds the processing to step S12. The operation control unit 21 repeats the pieces of processing from steps S2 to S11 until the field registration operation is accepted (S11: No). For example, when the operator presses the "register" button on the field registration screen D3, the operation control unit 21 accepts the field registration operation.

In step S12, the operation control unit 21 registers a field. Specifically, the operation control unit 21 registers, as the field F, an area (see FIG. 10) of a shape recognized based on the position information.

As described above, the operation control unit 21 registers the field F, based on an operation by the operator. Also, when the operation control unit 21 registers the field F, the operation control unit 21 generates the target route R (see FIG. 3) along which the work vehicle 10 is caused to automatically travel.

In addition, the operation control unit 21 outputs, to the work vehicle 10, route data on the target route R when the work vehicle 10 is caused to automatically travel. Upon acquiring the route data, the work vehicle 10 is started to automatic travel in response to an operation by the operator. This allows the work vehicle 10 to perform a predetermined work (e.g., a cultivating work), while automatically traveling along the target route R from the work start position S to the work finish position G in the field F (see FIG. 3).

As described above, the automatic traveling system 1 according to the present embodiment acquires position information of the work vehicle 10 traveling in a predetermined area in response to a traveling operation (manual traveling operation) by an operator, and records the position information, as a traveling trajectory of the work vehicle 10. The automatic traveling system 1 also temporarily stops recording processing of recording the position information, in a case where the work vehicle 10 is brought to a state in which the position information cannot be acquired during traveling, and notifies the operator of information indicating that the recording processing is temporarily stopped. The automatic traveling system 1 also registers a field, based on the acquired position information.

According to the above configuration, in a case where the work vehicle 10 is brought to a state in which the operation terminal 20 cannot acquire the position information from the work vehicle 10 because of loss of communication between the operation terminal 20 and the work vehicle 10, or lowering of positioning accuracy of positioning of the work vehicle 10, the automatic traveling system 1 allows the operator to recognize the state. This allows the operator to recognize that the work vehicle 10 is brought to a state in which the position information cannot be acquired during manual traveling. Therefore, the operator can take an action of waiting (stopping the vehicle) until the work vehicle 10 is restored to a state in which the position information can be acquired. This can prevent the work vehicle 10 from traveling around along an outer periphery of the field F, and from generating an area from which the position information cannot be acquired. Thus, since there is no need of traveling again along an outer periphery, it is possible to improve work efficiency of a registration work of registering a field.

Other Embodiment

As another embodiment, in a case where the work vehicle 10 is brought to a state in which the position information cannot be acquired, and the recording processing is temporarily stopped (see FIG. 8B), the operator may continue manual traveling without stopping the work vehicle 10. In this case, the position information is not recorded in a section where the work vehicle 10 has traveled in a state in which the recording processing is temporarily stopped. Further, when the work vehicle 10 travels in a state in which the position information cannot be acquired, and thereafter, is restored to a state in which the position information can be acquired, the operation control unit 21 resumes acquiring the position information, and resumes the recording processing of recording the position information.

In this way, even when the recording processing is temporarily stopped, the operator can manually travel the work vehicle 10 around along the outer periphery without stopping the work vehicle 10. In this case, a section excluding the position information is generated in a traveling trajectory along which the work vehicle 10 travels along the outer periphery.

In view of the above, in a case where the traveling trajectory includes a portion from which the position information could not be acquired, when the operator finishes traveling along the outer periphery, and presses the "measurement completion" button on the field measurement screen D2, the notification processing unit 216 causes to display, on the field registration screen D3 (see FIG. 12), a message M3 indicating that a portion from which the position information could not be acquired is present. The operation control unit 21 causes to display the field registration screen D3 illustrated in FIG. 13A, when the operator presses the "OK" button on the field registration screen D3 illustrated in FIG. 12.

In a case where the operator determines that the displayed field has an intended shape, the operator presses the "register" button. When the operator presses the "register" button, the operation control unit 21 registers, as the field F, the area (see FIG. 13A) of the shape recognized based on the position information.

In contrast, in a case where the operator determines that the shape of the displayed area (see FIG. 13A) is not an intended shape, the operator presses a "re-measure" button. Note that, in a case where the traveling trajectory of the work vehicle 10 includes a section excluding the position information, the operation control unit 21 may cause to display a message M4 (see FIG. 13B) asking whether to perform re-measurement (the recording processing). When the operator presses the "re-measure" button on the field registration screen D3 illustrated in FIG. 13A, or a "Yes (re-measure)" button on the message M4 (see FIG. 13B), the operation control unit 21 performs re-measurement processing. The operation control unit 21 also causes to display the field measurement screen D2 illustrated in FIG. 13C.

Figure 13A:
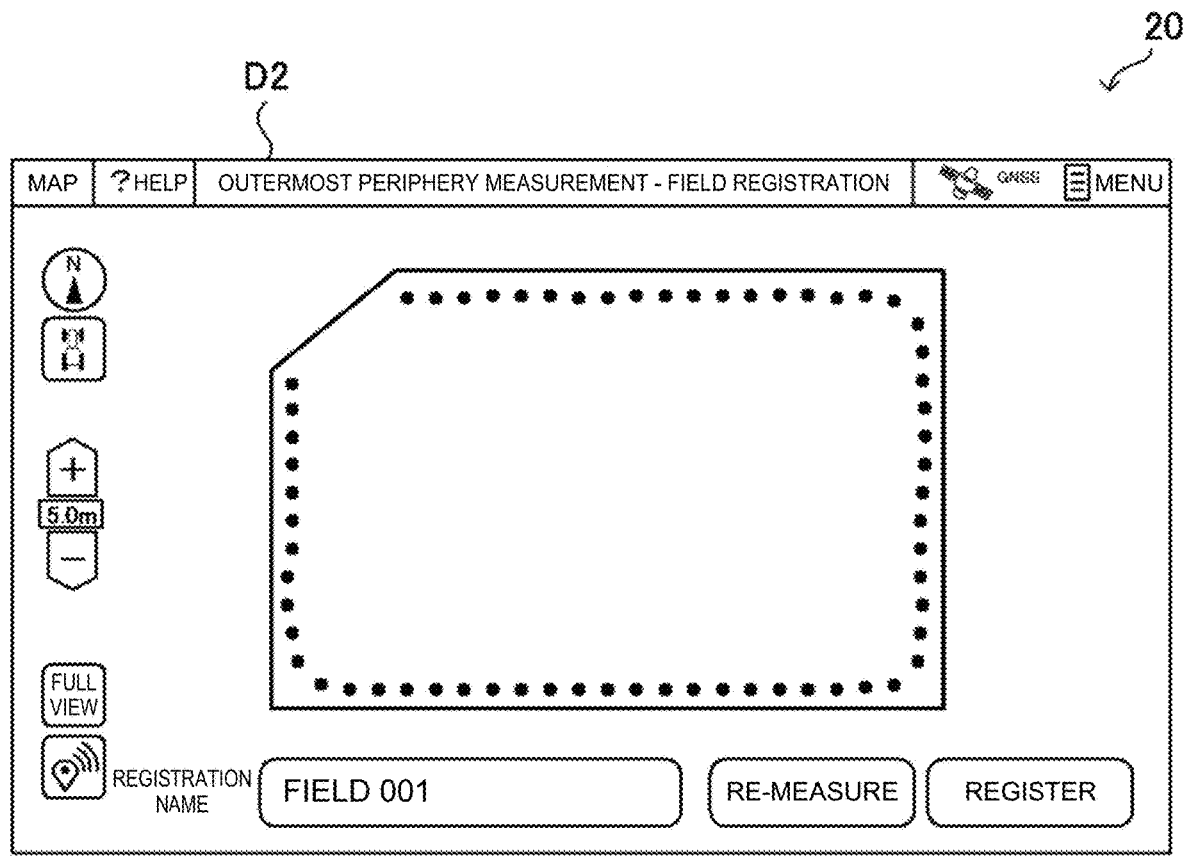
FIG. 13A is a diagram illustrating an example of the field registration screen to be displayed on the operation terminal according to the embodiment of the present invention.
Figure 13B:
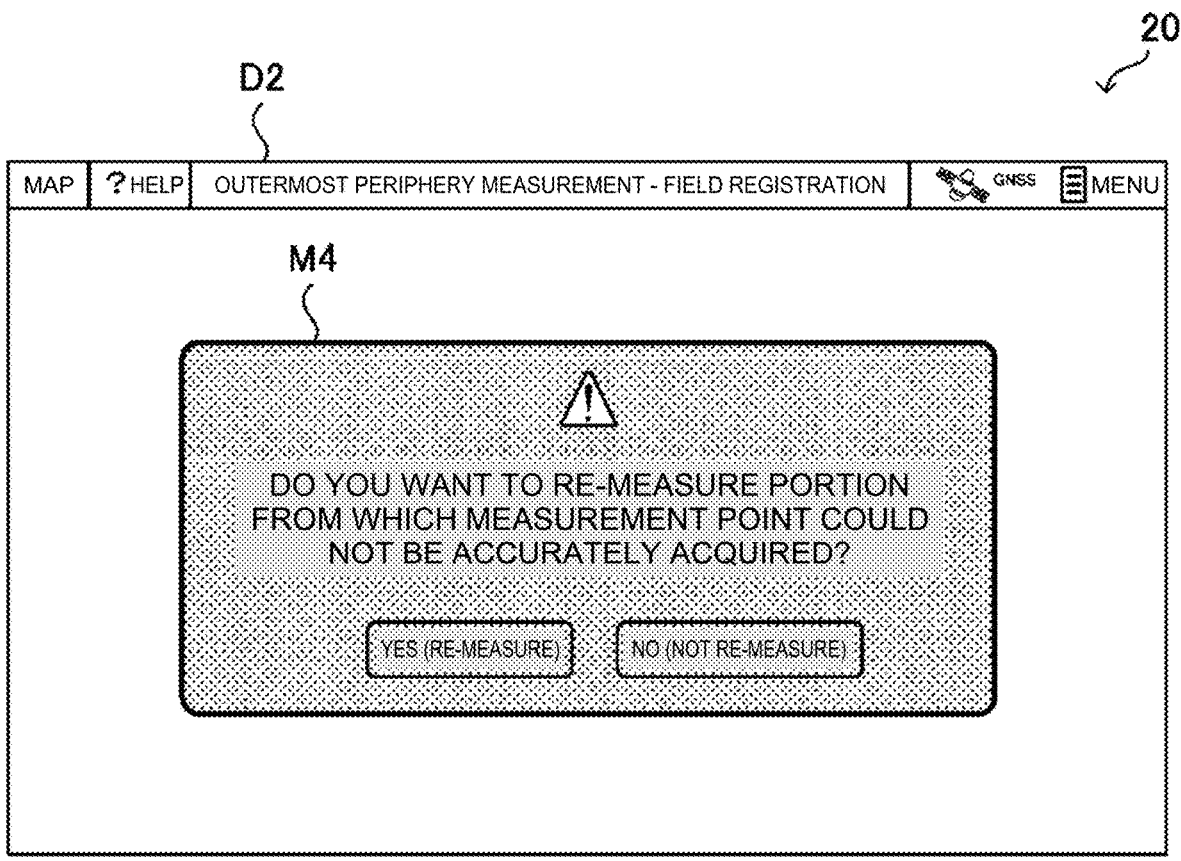
FIG. 13B is a diagram illustrating an example of the field registration screen to be displayed on the operation terminal according to the embodiment of the present invention.
Figure 13C:
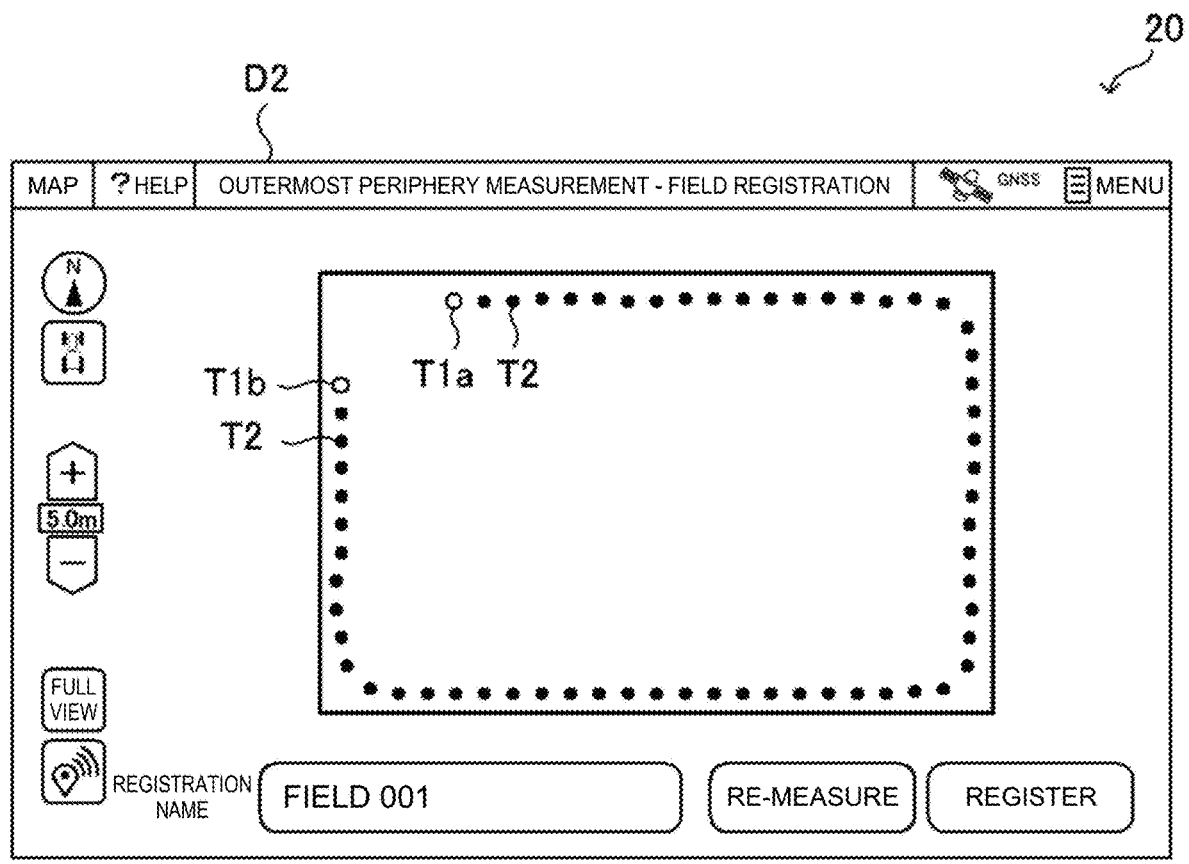
FIG. 13C is a diagram illustrating an example of the field registration screen to be displayed on the operation terminal according to the embodiment of the present invention.

On the field measurement screen D2 illustrated in FIG. 13C, the operation control unit 21 causes to display, in an identifiable manner, at least one of a position at which the work vehicle is brought to a state in which the position information cannot be acquired, and a position at which the work vehicle is restored to a state in which the position information can be acquired. For example, as illustrated in FIG. 13C, the operation control unit 21 causes to display a position T1a at which the work vehicle is brought to a state in which the position information cannot be acquired, and a position T1b at which the work vehicle is restored to a state in which the position information can be acquired in a different manner from that of a position T2 at which the position information is acquirable (acquired). Note that, the operation control unit 21 may cause to display only the position T1a in a different manner from that of the position T2, or may display only the position T1b in a different manner from that of the position T2.

According to the above configuration, the operator can easily recognize a portion from which the position information could not be acquired. Therefore, the operator can perform teaching traveling (manual traveling) again only for a portion (section from T1a to T1b) from which the position information could not be acquired.

When the operator performs manual traveling in the portion (section from T1a to T1b) in re-measurement processing, the operation control unit 21 acquires position information on the portion, and additionally records acquired position information except for the portion. The operation control unit 21 recognizes a position and a shape of a traveling area, based on position information on the portion, and acquired position information except for the portion, and registers, as the field F. This enables to register the field F intended by the operator.

In this way, in a case where a portion from which the position information could not be acquired is included, as a result of traveling of the work vehicle 10 in the predetermined area F0, the operation control unit 21 causes the operation terminal 20 to display, in an identifiable manner, at least one of the position T1a at which the work vehicle 10 is brought to a state in which the position cannot be acquired, and the position T1b at which the work vehicle 10 is restored to a state in which the position information can be acquired. Also, the operation control unit 21 registers the field F, based on acquired position information except for the portion, and position information acquired by causing the work vehicle 10 to travel only in the portion.

Figure 8A:
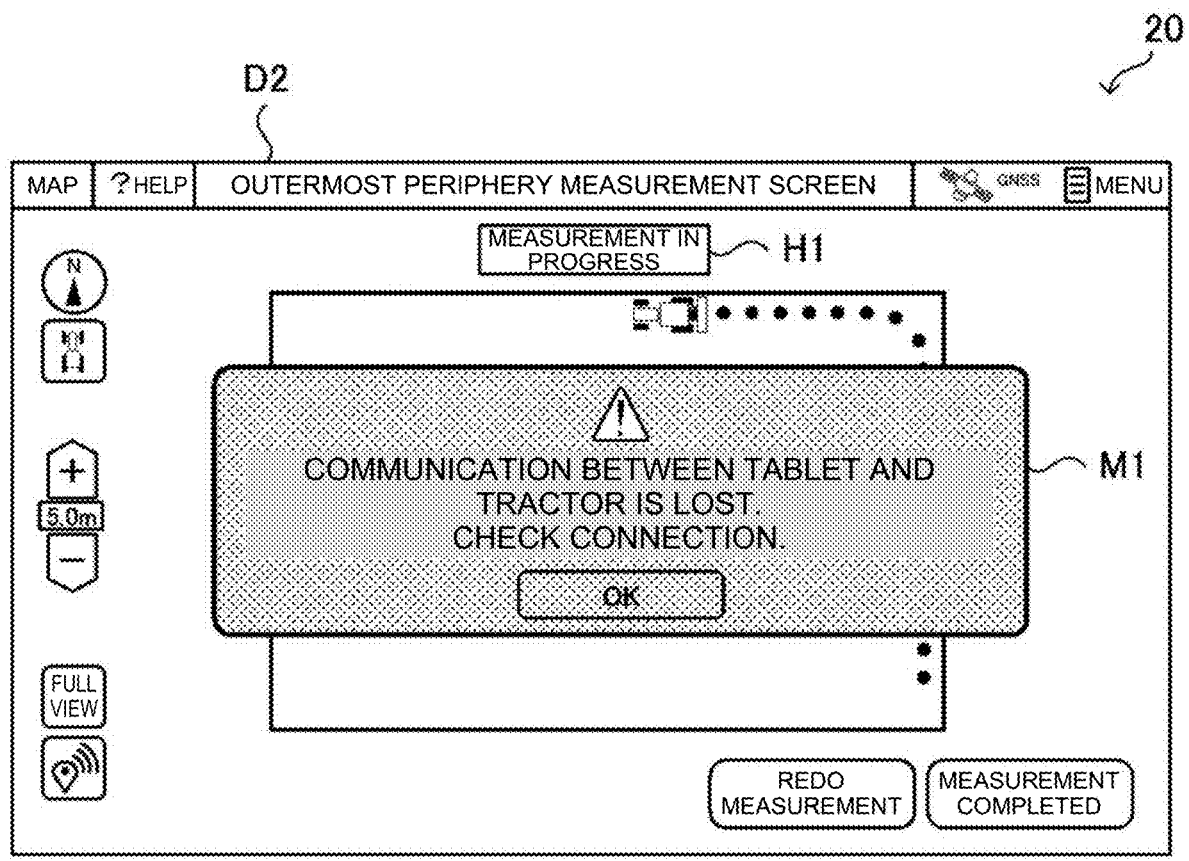
FIG. 8A is a diagram illustrating an example of the field measurement screen to be displayed on the operation terminal according to the embodiment of the present invention.
Figure 8B:
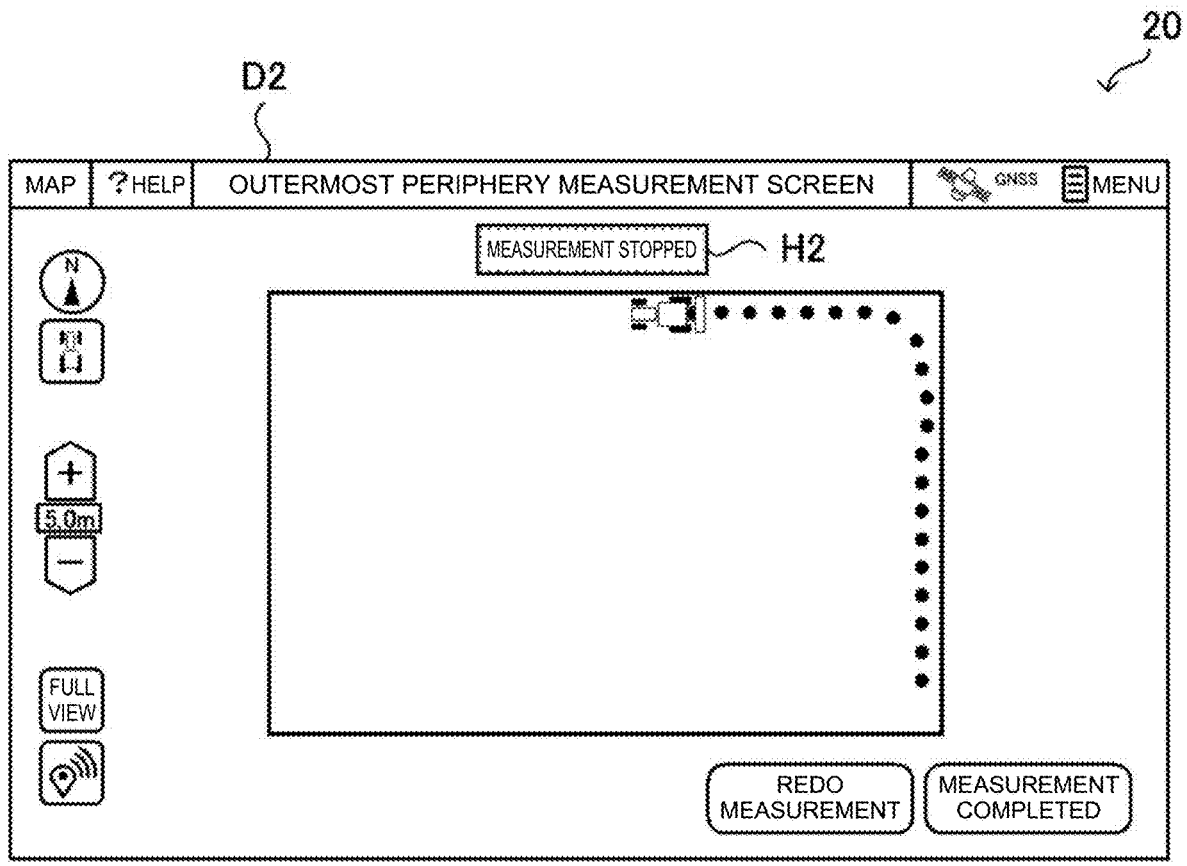
FIG. 8B is a diagram illustrating an example of the field measurement screen to be displayed on the operation terminal according to the embodiment of the present invention.

By the way, in the embodiment illustrated in FIG. 8B, the operation control unit 21 causes the operation terminal 20 to display information (the message H2 "measurement stopped") indicating that the recording processing is temporarily stopped. The present invention is not limited to this, and as another embodiment, the operation control unit 21 may cause the operation terminal 20 to audibly output the message H2 "measurement stopped". Furthermore, as another embodiment, the operation control unit 21 may perform both processing of causing the operation terminal 20 to display the message H2 "measurement stopped", and processing of causing the operation terminal 20 to audibly output the message H2 "measurement stopped".

Figure 7:
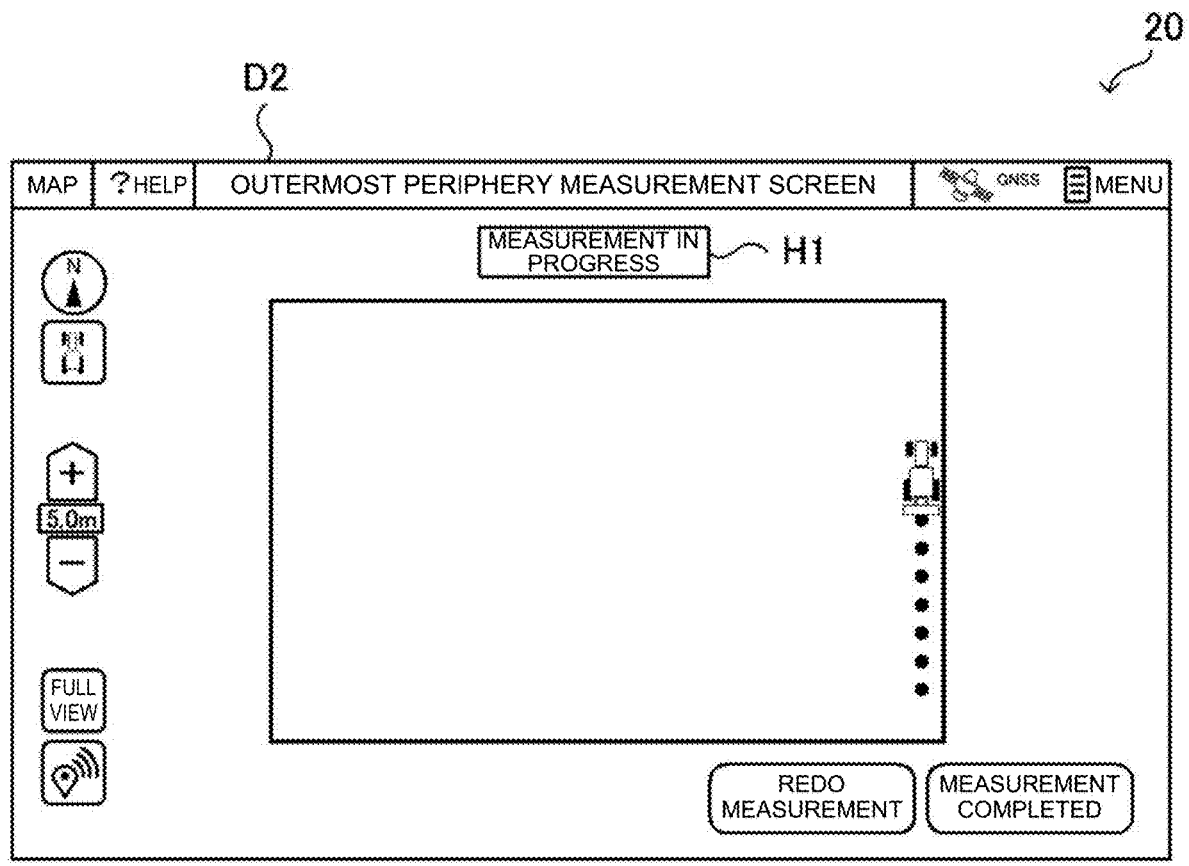
FIG. 7 is a diagram illustrating an example of the field measurement screen to be displayed on the operation terminal according to the embodiment of the present invention.
Figure 9:
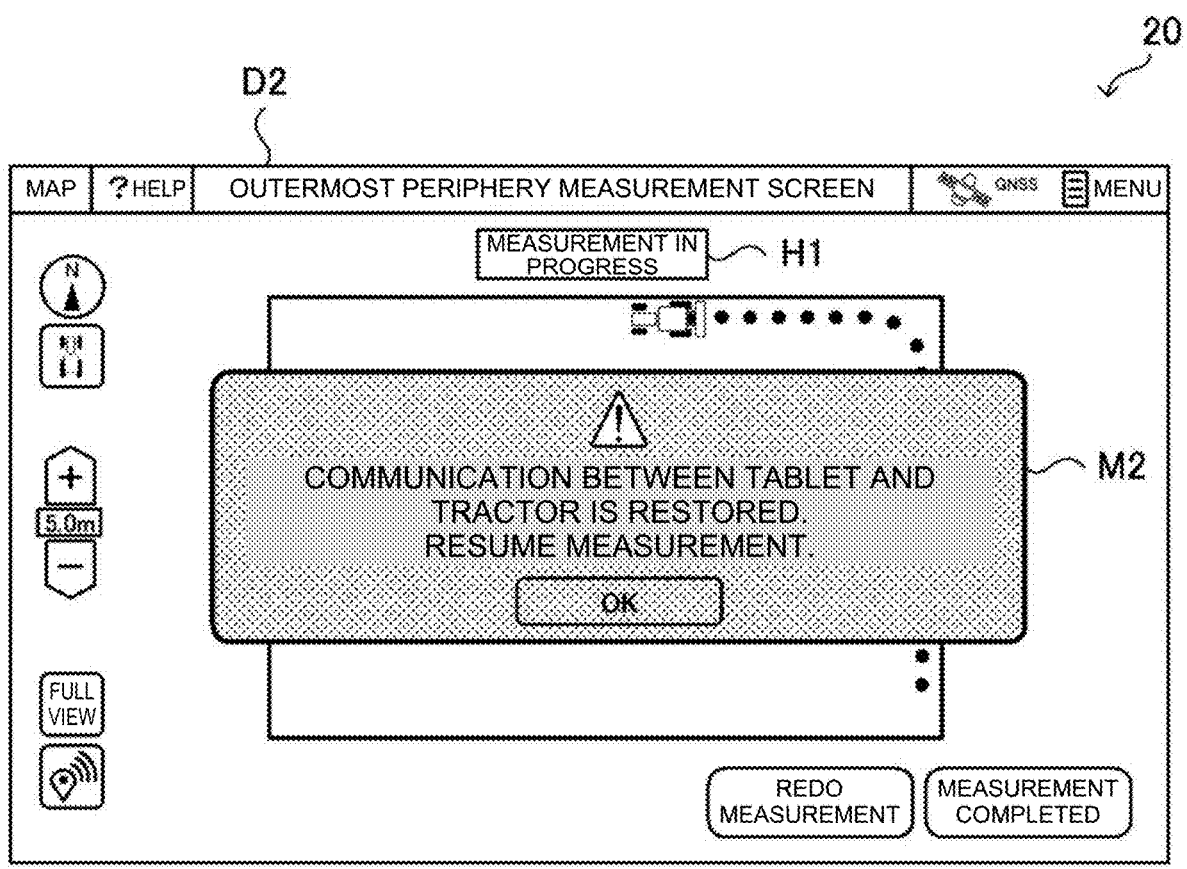
FIG. 9 is a diagram illustrating an example of the field measurement screen to be displayed on the operation terminal according to the embodiment of the present invention.
Figure 12:
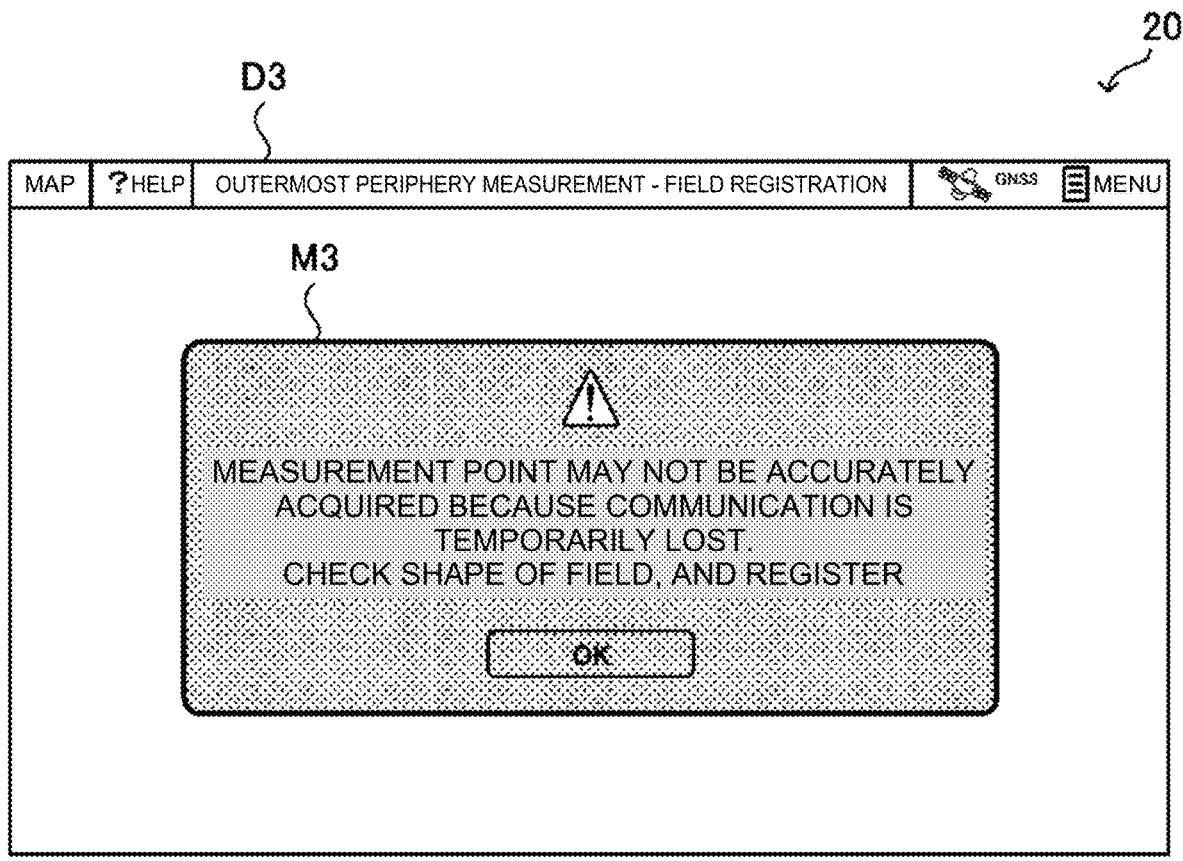
FIG. 12 is a diagram illustrating an example of the field measurement screen to be displayed on the operation terminal according to the embodiment of the present invention.

In addition, the operation control unit 21 may cause the operation terminal 20 to perform at least one of display processing and audio output processing also for the message H1 illustrated in FIG. 7 and the like, the message M1 illustrated in FIG. 8A, the message M2 illustrated in FIG. 9, the message M3 illustrated in FIG. 12, and the message M4 illustrated in FIG. 13B.

The configuration of audibly outputting the message H1 illustrated in FIG. 7 is suitable, for example, for the work vehicle 10 in which measurement for field registration is performed, while performing a work by lowering the work machine 14 during teaching traveling. For example, the operation control unit 21 may start measurement, in a case where traveling is started by lowering the work machine 14 by the operator. In other words, the operation control unit 21 may start measurement, in a case where lowering of the work machine 14 and start of traveling are accepted without accepting a pressing operation of the "measurement start" button (see FIG. 5) by the operator. In this case, preferably, the operation control unit 21 may display the message H1 on the field measurement screen D2 (see FIG. 7), and also audibly output the message to allow the operator to recognize that measurement has started.

The operation terminal 20 according to the present embodiment may be loaded in the work vehicle 10, or may be disposed outside the work vehicle 10. Also, each processing unit of the operation terminal 20 may be included in the vehicle control device 11 of the work vehicle 10. In other words, in the embodiment described above, the operation terminal 20 is equivalent to a route generation system according to the present invention, but the route generation system according to the present invention may be constituted of the work vehicle 10 alone. The route generation system according to the present invention may also include the work vehicle 10 and the operation terminal 20. Also, each processing unit of the operation terminal 20 may be included in a server communicable with the work vehicle 10.

REFERENCE SIGNS LIST

1: Automatic traveling system
10: Work vehicle
14: Work machine
16: Positioning device
20: Operation terminal
21: Operation control unit
211: Setting processing unit (registration processing unit)
212: Acceptance processing unit
213: Acquisition processing unit
214: Recording processing unit
215: Determination processing unit
216: Notification processing unit
F: Field

The invention claimed is:

1. A field registration method comprising:
acquiring position information of a work vehicle traveling in a predetermined area in response to a traveling operation by a user;
recording the position information, as a traveling trajectory of the work vehicle;
temporarily stopping recording processing of recording the position information, in a case where the work vehicle is brought to a state in which the position information cannot be acquired during traveling;
notifying the user of information indicating that the recording processing is temporarily stopped; and
registering a field, based on the position information.

2. The field registration method according to claim 1, wherein
the recording processing is resumed, in a case where the work vehicle is restored to a state in which the position information can be acquired after the recording processing is temporarily stopped.

3. The field registration method according to claim 1, wherein
in a case where a portion from which the position information cannot be acquired is included, as a result that the work vehicle travels in the predetermined area, information indicating that the portion is present is notified to the user.

4. The field registration method according to claim 3, wherein the field is registered based on the acquired position information except for the portion, and the position information acquired by causing the work vehicle to travel only in the portion.

5. The field registration method according to claim 1, wherein
in a case where a portion from which the position information cannot be acquired is included, as a result that the work vehicle travels in the predetermined area, at least one of a position at which the work vehicle is brought to a state in which the position information cannot be acquired, and a position at which the work vehicle is restored to a state in which the position information can be acquired is displayed on an operation terminal in an identifiable manner.

6. The field registration method according to claim 1, wherein
in a case where a portion from which the position information cannot be acquired is included, as a result that the work vehicle travels in the predetermined area, information asking whether to perform the recording processing again for the portion is caused to be displayed on an operation terminal.

7. The field registration method according to claim 1, wherein,
in a case where the work vehicle is in a state in which the position information can be acquired, on an operation terminal, a position associated with the position information is caused to be displayed on a map, and information indicating that the recording processing is being performed is caused to be displayed.

8. The field registration method according to claim 1, wherein
in a case where the work vehicle is brought to a state in which the position information cannot be acquired, on an operation terminal, a position associated with the acquired position information is caused to be displayed on a map, and information indicating that the recording processing is temporarily stopped is caused to be displayed.

9. The field registration method according to claim 1, wherein
at least one of processing of causing an operation terminal to display information indicating that the recording processing is temporarily stopped, and processing of causing the operation terminal to audibly output the information is performed.

10. A field registration system comprising:
an acquisition processing unit that acquires position information of a work vehicle traveling in a predetermined area in response to a traveling operation by a user;
a recording processing unit that records the position information, as a traveling trajectory of the work vehicle, and temporarily stopping recording processing of recording the position information, in a case where the work vehicle is brought to a state in which the position information cannot be acquired during traveling;
a notification processing unit that notifies the user of information indicating that the recording processing is temporarily stopped; and
a registration processing unit that registers a field, based on the position information.

11. A non-transitory computer-readable medium comprising instructions that when executed by one or more processors perform steps in a field registration method, the method comprising:
acquiring position information of a work vehicle traveling in a predetermined area in response to a traveling operation by a user;
recording the position information, as a traveling trajectory of the work vehicle;
temporarily stopping recording processing of recording the position information, in a case where the work vehicle is brought to a state in which the position information cannot be acquired during traveling;
notifying the user of information indicating that recording processing is temporarily stopped; and
registering a field, based on the position information.

* * * * *